US012077005B2

(12) United States Patent
Kimoto

(10) Patent No.: US 12,077,005 B2
(45) Date of Patent: Sep. 3, 2024

(54) THERMAL PRINT HEAD, THERMAL PRINTER, AND METHOD FOR MANUFACTURING THERMAL PRINT HEAD

(71) Applicant: ROHM CO., LTD., Kyoto (JP)

(72) Inventor: Satoshi Kimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 50 days.

(21) Appl. No.: 17/915,274

(22) PCT Filed: Mar. 26, 2021

(86) PCT No.: PCT/JP2021/012824
§ 371 (c)(1),
(2) Date: Sep. 28, 2022

(87) PCT Pub. No.: WO2021/205904
PCT Pub. Date: Oct. 14, 2021

(65) Prior Publication Data

US 2023/0140231 A1 May 4, 2023

(30) Foreign Application Priority Data

Apr. 7, 2020 (JP) ................................ 2020-069149

(51) Int. Cl.
*B41J 2/335* (2006.01)
*B41J 2/34* (2006.01)
*B41J 2/345* (2006.01)

(52) U.S. Cl.
CPC ........... *B41J 2/3352* (2013.01); *B41J 2/3351* (2013.01); *B41J 2/33515* (2013.01);
(Continued)

(58) Field of Classification Search
CPC .... B41J 2/3352; B41J 2/3351; B41J 2/33515; B41J 2/33525; B41J 2/3353;
(Continued)

(56) References Cited

U.S. PATENT DOCUMENTS

2013/0286137 A1* 10/2013 Fujiwara .............. B41J 2/33515
347/204
2019/0111705 A1* 4/2019 Matsusaki .............. B41J 2/3353

FOREIGN PATENT DOCUMENTS

JP 2017-65021 A 4/2017
JP 2019-166824 A 10/2019
JP 2019166824 A * 10/2019 .......... B41J 2/33505

OTHER PUBLICATIONS

International Search Report issued in PCT/JP2021/012824, Jun. 15, 2021 (2 pages).

* cited by examiner

*Primary Examiner* — Yaovi M Ameh
(74) *Attorney, Agent, or Firm* — HSML P.C.

(57) ABSTRACT

A thermal print head includes a substrate, a resistor layer and a wiring layer. The substrate is made of a single crystal semiconductor and includes an obverse surface facing in one sense of a thickness direction. The resistive layer is supported by the substrate and includes a plurality of heat generating parts arranged side by side in a main scanning direction. The wiring layer is supported by the substrate and forms a conductive path to the plurality of heat generating parts. The wiring layer includes a conductive part and a heat generating sub-part for each of the plurality of heat generating parts, where the conductive part has a lower resistance value per unit length in a sub-scanning direction than the heat generating part, and where the heat generating sub-part has a resistance value per unit length in the sub-scanning direction that falls between the respective resistance values of the heat generating part and the conductive part. The substrate includes a ridge raised from the obverse surface and extending in the main scanning direction. The heat generating part, the heat generating sub-part and the conductive part are disposed on the ridge. The heat generating
(Continued)

sub-part is located between the heat generating part and the conductive part in the sub-scanning direction.

24 Claims, 33 Drawing Sheets

(52) U.S. Cl.
CPC ......... *B41J 2/33525* (2013.01); *B41J 2/3353* (2013.01); *B41J 2/33535* (2013.01); *B41J 2/3354* (2013.01); *B41J 2/33545* (2013.01); *B41J 2/3355* (2013.01); *B41J 2/3357* (2013.01); *B41J 2/3359* (2013.01); *B41J 2/34* (2013.01); *B41J 2/345* (2013.01)

(58) Field of Classification Search
CPC .. B41J 2/33535; B41J 2/3354; B41J 2/33545; B41J 2/3355; B41J 2/3357; B41J 2/3359; B41J 2/34; B41J 2/345
See application file for complete search history.

THERMAL PRINT HEAD, THERMAL PRINTER, AND METHOD FOR MANUFACTURING THERMAL PRINT HEAD

TECHNICAL FIELD

The present disclosure relates to a thermal print head and a thermal printer. The present disclosure also relates to a method for manufacturing a thermal print head.

BACKGROUND ART

Patent document 1 discloses a conventional thermal print head. The thermal print head includes a main substrate having a conductive layer and a resistive layer, and a circuit board having a driver IC mounted thereon. The resistive layer includes a plurality of heat generating parts arranged side by side in the main scanning direction. The conductive layer forms a conductive path for passing electrical current to the heat generating parts.

For printing by the thermal print head, electric current is passed to the resistive layer to cause the heat generating parts to generate heat. The heat is transferred to a print medium (e.g., a thermal recording paper), so that the color of the print medium changes to form an image.

PRIOR ART DOCUMENT

Patent Document

Patent Document 1: JP-A-2017-65021

SUMMARY OF THE INVENTION

Problem to be Solved by the Invention

One object of the present disclosure is to provide a thermal print head and a thermal printer having higher durability and reliability than conventional designs. Another object of the present disclosure is to provide a method for manufacturing such a thermal print head.

Means to Solve the Problem

A first aspect of the present disclosure provides a thermal print head that includes: a substrate made of a single crystal semiconductor and including an obverse surface facing in one sense of a thickness direction; a resistive layer supported by the substrate and including a plurality of heat generating parts arranged side by side in a main scanning direction; and a wiring layer supported by the substrate and forming a conductive path to the plurality of heat generating parts. The wiring layer includes a conductive part and a heat generating sub-part for each of the plurality of heat generating parts, where the conductive part has a lower resistance value per unit length in a sub-scanning direction than the heat generating part, and where the heat generating sub-part has a resistance value per unit length in the sub-scanning direction that falls between the respective resistance values of the heat generating part and the conductive part. The substrate includes a ridge raised from the obverse surface and extending in the main scanning direction. The heat generating part, the heat generating sub-part and the conductive part are disposed on the ridge. The heat generating sub-part is located between the heat generating part and the conductive part in the sub-scanning direction.

A second aspect of the present disclosure provides a thermal printer that includes the thermal print head of the first aspect, and a platen directly opposite the thermal print head.

A third aspect of the present disclosure provides a method for manufacturing a thermal print heat, the method including: a substrate preparing step of preparing a substrate made of a single crystal semiconductor; a substrate processing step of processing the substrate to form an obverse surface facing in one sense of a thickness direction and a ridge that is raised from the obverse surface and extends in a main scanning direction; a resistive layer forming step of forming a resistive layer that is supported by the substrate and includes a plurality of heat generating parts arranged side by side in the main scanning direction; and a wiring layer forming step of forming a wiring layer that is supported by the substrate and forms a conductive path to the plurality of heat generating parts. The wiring layer includes a conductive part and a heat generating sub-part for each of the plurality of heat generating parts, where the conductive part has a lower resistance value per unit length in a sub-scanning direction than the heat generating part, and where the heat generating sub-part has a resistance value per unit length in the sub-scanning direction that falls between the respective resistance values of the heat generating part and the conductive part. The heat generating part, the heat generating sub-part and the conductive part are formed on the ridge. The heat generating sub-part is located between the heat generating part and the conductive part in the sub-scanning direction.

Advantages of Invention

The present disclosure provides a thermal print head (and a thermal printer) having higher durability and reliability. Additionally, the present disclosure can provide a method for manufacturing a thermal print head having higher durability and reliability.

MODE FOR CARRYING OUT THE INVENTION

Figure 1:
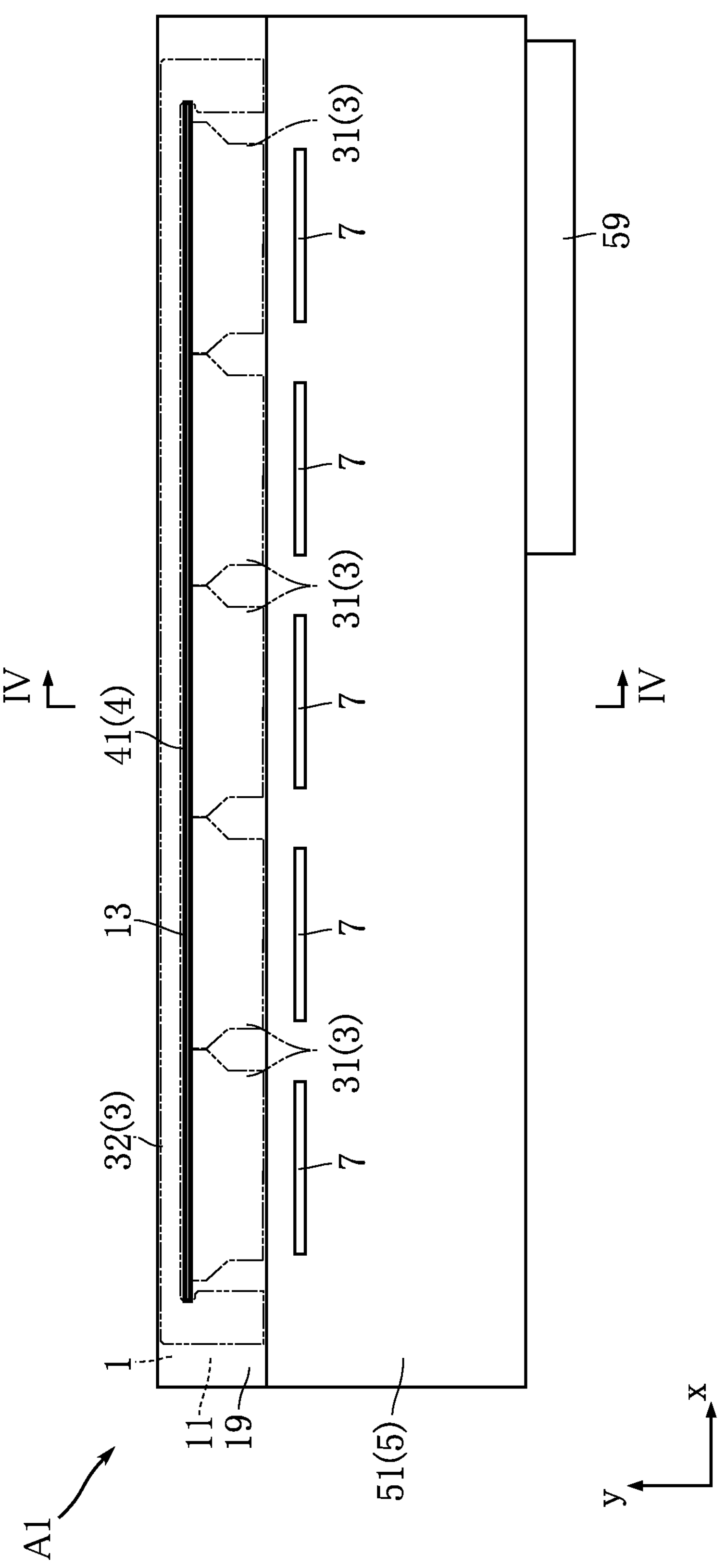
FIG. 1 is a plan view of a thermal print head according to a first embodiment.

Embodiments of the present disclosure will be described below with reference to the drawings. In the following description, the same or slimier components are denoted by the same reference numerals, and a description of such a component is omitted.

FIGS. 1 to 6 show a thermal print head A1 according to a first embodiment. The thermal print head A1 includes a head substrate 1, an insulating layer 19, a protective layer 2, a wiring layer 3, a resistive layer 4, a connecting substrate 5, a plurality of wires 61 and 62, a plurality of driver ICs 7, a protective resin 78 and a heat dissipating member 8. The thermal print head A1 is a component installed into a thermal printer Pr (see FIG. 4), which is for printing an image on a print medium (not shown). The thermal printer Pr includes the thermal print head A1 and a platen roller 91. The platen roller 91 is disposed directly opposite the thermal print head A1. The platen roller 91 forwards a print medium inserted between the thermal print head A1 and the platen roller 91 in a sub-scanning direction. Examples of print media include thermal recording paper, such as for thermal barcode labels and thermal receipts. The platen roller 91 may alternatively be a planar platen made of rubber. The planar platen may have an arc shape in cross section and may be a part of a cylindrical rubber member having a relatively large radius of curvature. The platen roller 91 and a planar platen are both examples of the "platen" according to the present disclosure.

Figure 2:
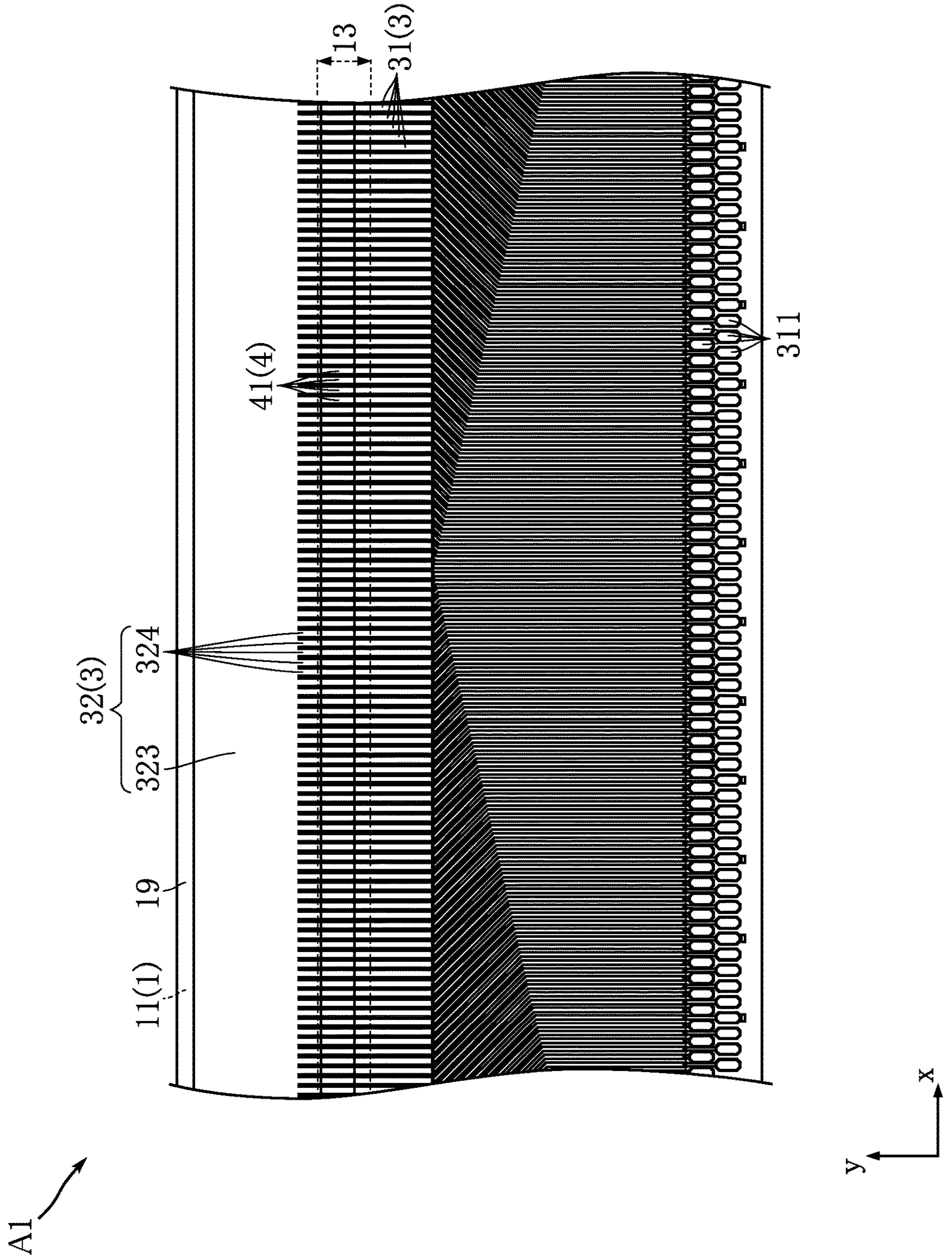
FIG. 2 is an enlarged fragmentary plan view of FIG. 1.
Figure 3:
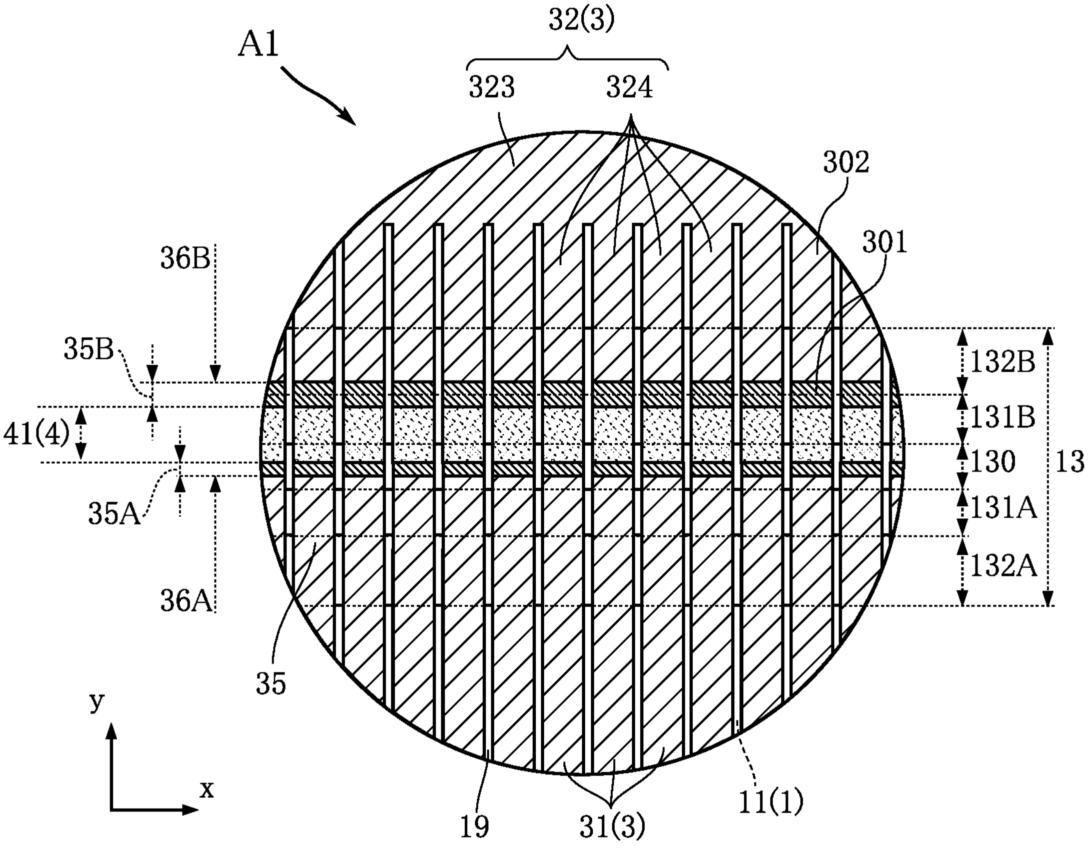
FIG. 3 is an enlarged fragmentary plan view of FIG. 2.
Figure 4:
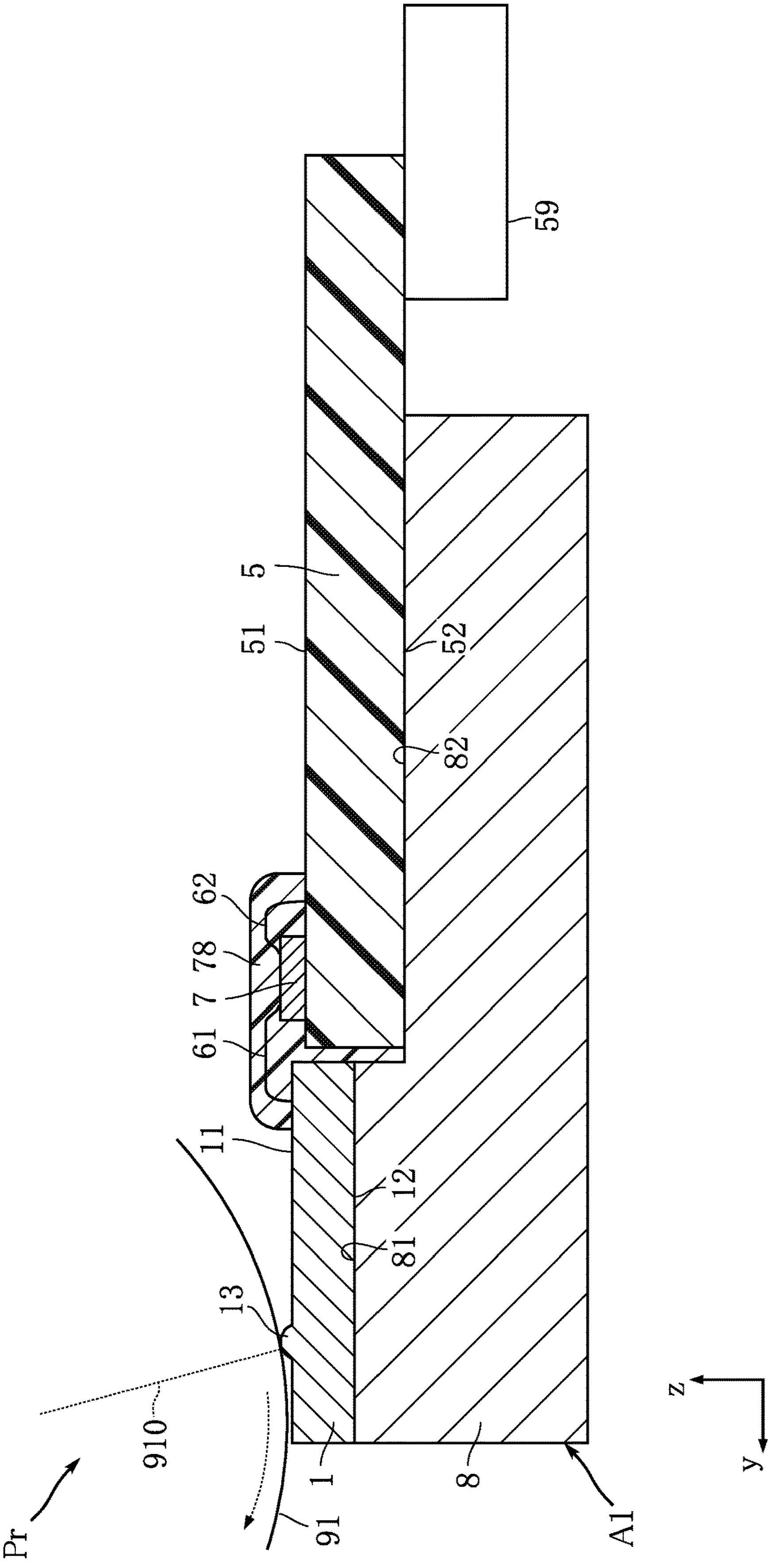
FIG. 4 an enlarged fragmentary sectional view taken along line IV-IV of FIG. 1 and showing a thermal printer that includes the thermal print head of the first embodiment.
Figure 5:
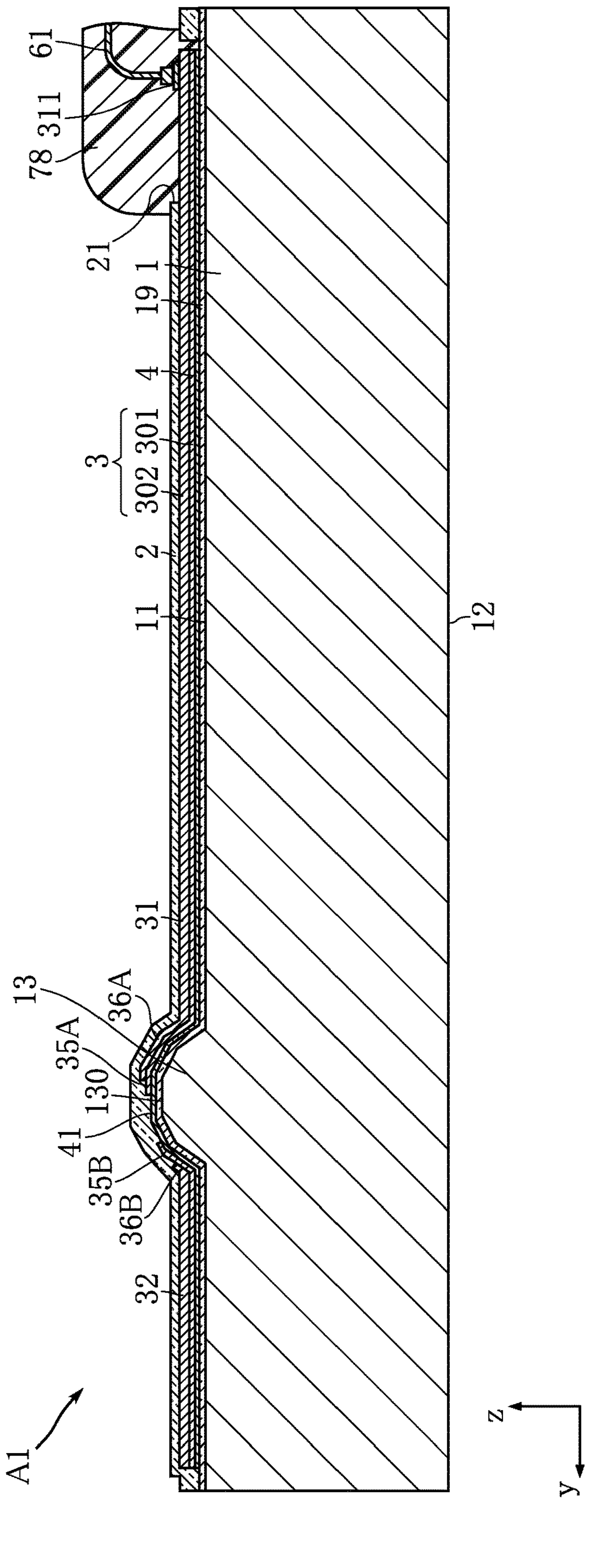
FIG. 5 is an enlarged sectional view showing a part of FIG. 4.
Figure 6:
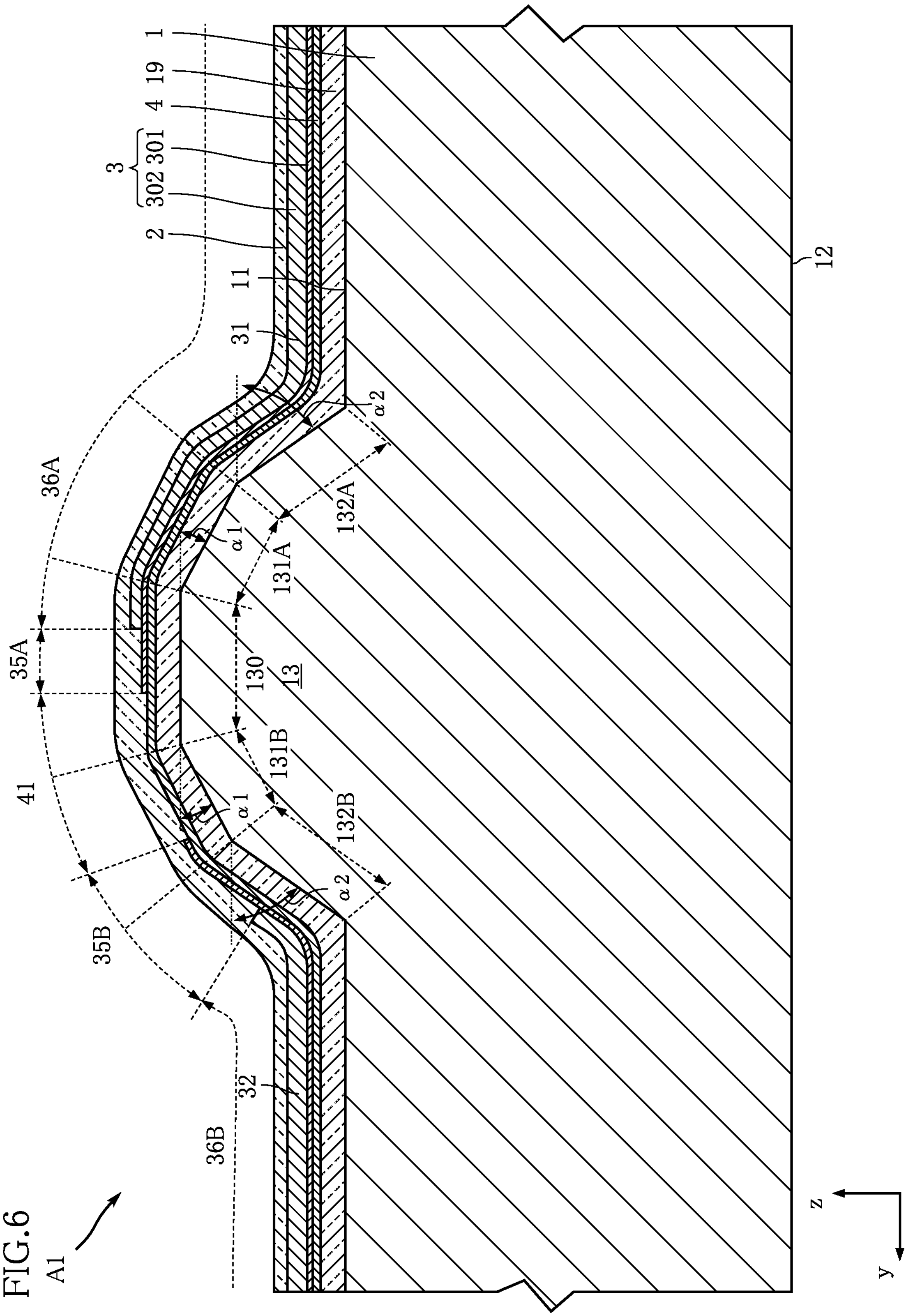
FIG. 6 is an enlarged fragmentary sectional view of FIG. 5.

FIG. 1 is a plan view of the thermal print head A1. FIG. 2 is a fragmentary plan view of the thermal print head A1. FIG. 3 is a fragmentary enlarged plan view of the thermal print head A1. FIG. 4 is a fragmentary enlarged sectional view of a thermal printer Pr installed with the thermal print head A1. The section shown in this figure corresponds to a section taken along line IV-IV of FIG. 1. FIG. 5 is a fragmentary sectional view of the thermal print head A1. FIG. 6 is a fragmentary enlarged sectional view of the thermal print head A1. In FIGS. 1 to 3, the protective layer 2 is omitted. In FIGS. 1 and 2, the protective resin 78 is omitted. In FIG. 2, the wires 61 are omitted. In FIGS. 1 to 3, the lower side corresponds to the upstream in the sub-scanning direction y, and the upper side to the downstream. In FIGS. 4 to 6, the right side corresponds to the upstream in the sub-scanning direction y, and the left side to the downstream.

The head substrate 1 supports the wiring layer 3 and the resistive layer 4. The head substrate 1 has a rectangular shape elongated in the main scanning direction x. In the following description, the thickness direction of the head substrate 1 is designated as a thickness direction z. The head substrate 1 is not limited to specific dimensions. In one example, the head substrate 1 measures 725 μm in thickness (a dimension in the thickness direction z), from 50 to 150 mm in the main scanning direction x, and from 2.0 to 5.0 mm in the sub-scanning direction y.

The head substrate 1 is made of a single crystal semiconductor, such as silicon (Si). As shown in FIGS. 4 and 5, the head substrate 1 has a first obverse surface 11 and a first reverse surface 12. The first obverse surface 11 and the first reverse surface 12 are spaced apart in the thickness direction z and face away from each other in the thickness direction z. The wiring layer 3 and the resistive layer 4 are disposed on the side of the first obverse surface 11. The head substrate 1 is an example of the "substrate", and the first obverse surface 11 is an example of the "obverse surface".

The head substrate 1 has a ridge 13. The ridge 13 is raised from the first obverse surface 11 in the thickness direction z and elongated in the main scanning direction x. In the illustrated example, the ridge 13 is offset in the sub-scanning direction y toward the downstream end of the head substrate 1. The ridge 13, which is a part of the head substrate 1, is made of the single crystal semiconductor, such as Si.

The ridge 13 has a top part 130, a pair of first slopes 131A and 131B, and a pair of second slopes 132A and 132B.

The top part 130 is where the distance from the first obverse surface 11 is largest within the ridge 13. The top part 130 may be a flat surface substantially parallel to the first obverse surface 11, for example. In view of the thickness direction z, the top part 130 has the shape of a long narrow rectangle extending in the main scanning direction x.

As shown in FIG. 6, the first slopes 131A and 131B are connected to the opposite ends of the top part 130 in the sub-scanning direction y. The first slope 131A is connected to the top part 130 on the upstream side in the sub-scanning direction y. The first slope 131B is connected to the top part 130 on the downstream side in the sub-scanning direction y. The first slope 131A is an example of "upstream-side first slope", whereas the first slope 131B is an example of "downstream-side first slope". Each of the first slopes 131A and 131B is inclined at an angle $\alpha 1$ to the first obverse surface 11 (forms a first inclination angle of $\alpha 1$). As viewed in the thickness direction z, each of the first slopes 131A and 131B is a flat surface having the shape of a long narrow rectangle extending in the main scanning direction x. The ridge 13 may also have slopes (not shown) connected to the first slopes 131A and 131B at the respective ends of the ridge 13 in the main scanning direction x.

As shown in FIG. 6, the second slopes 132A and 132B are respectively connected to the first slopes 131A and 131B on the sides away from the top part 130 in the sub-scanning direction y. The second slope 132A is located between the first slope 131A and the first obverse surface 11 in the sub-scanning direction y. The second slope 132A connects to the first slope 131A from the upstream side in the sub-scanning direction y, and to the first obverse surface 11 from the downstream side in the sub-scanning direction y. The second slope 132B is located between the first slope 131B and the first obverse surface 11 in the sub-scanning direction y. The second slope 132B connects to the first slope 131B from the downstream side in the sub-scanning direction y and to the first obverse surface 11 from the upstream side in the sub-scanning direction y. The second slope 132A is an example of "upstream-side second slope", whereas the second slope 132B is an example of "downstream-side second slope". Each of the second slopes 132A and 132B is inclined at an angle $\alpha 2$ to the first obverse surface 11 (forms a second inclination angle of $\alpha 2$). The angle $\alpha 2$ is greater than the angle $\alpha 1$. As viewed in the thickness direction z, each of the second slopes 132A and 132B is a flat surface having the shape of a long narrow rectangle extending in the main scanning direction x. The second slopes 132A and 132B are both connected to the first obverse surface 11. The ridge 13 may also have slopes (not shown) connected to the second slopes 132A and 132B at the respective ends of the ridge 13 in the main scanning direction x.

The first obverse surface 11 of the head substrate 1 has a (100) plane (by the Miller Indices). According to the manufacturing method described below, the angle $\alpha 1$ (see FIG. 6) formed by the first slopes 131A and 131B relative to the first obverse surface 11 is 30.1 degrees, for example. The angle $\alpha 2$ (see FIG. 6) formed by the second slopes 132A and 132B relative to the first obverse surface 11 is 54.7 degrees, for example. The dimension of the ridge 13 in the thickness direction z is from 150 to 300 μm, for example.

As shown in FIGS. 5 and 6, the insulating layer 19 covers the first obverse surface 11 and the ridge 13. The insulating layer 19 is provided for more reliably insulating the first obverse surface 11 of the head substrate 1. The insulating layer 19 is made of an insulating material. For example, the insulating layer 19 may be made of a $SiO_2$ film deposited by using tetraethyl orthosilicate (TEOS) as a material gas (TEOS—$SiO_2$ film). Instead of a TEOS—$SiO_2$ film, the insulating layer 19 may be made of a film of $SiO_2$ formed by a different process or a SiN film. The thickness of the insulating layer 19 is not limited. In one example, the thickness of the insulating layer 19 is from 5 to 15 μm (preferably from 5 to 10 μm).

The resistive layer 4 is supported by the head substrate 1. As shown in FIGS. 5 and 6, the resistive layer 4 of this embodiment is supported on the head substrate 1 via the insulating layer 19. The resistive layer 4 has a plurality of heat generating parts 41. The heat generating parts 41 are selectively energized to heat the desired parts of a print medium. The heat generating parts 41 are regions of the resistive layer 4 not covered with the wiring layer 3. The heat generating parts 41 are arranged side by side in the main scanning direction x at spaced intervals. The shape of the heat generating parts 41 may be, but not limited to, a rectangle elongated in the sub-scanning direction y as viewed in the thickness direction z. The resistive layer 4 is made of a material having higher resistivity than the wiring layer 3. Preferably, the electrical resistivity of the resistive layer 4 is $10^{-6}$ Ωm or higher. The resistive layer 4 may be made of TaN in one example, and other suitable materials include $TaSiO_2$, TION, PolySi, $Ta_2O_5$, $RuO_2$, RuTiO and TaSiN. The resistive layer 4 can be formed by any suitable process, such as sputtering, CVD and plating, depending on the material used. For example, when the material is TaN, the resistive layer 4 can be formed by sputtering. The thickness of the resistive layer 4 is not limited. In one example, the thickness of the resistive layer 4 is from 0.02 to 0.1 μm (preferably around 0.08 μm).

As shown in FIG. 6, each heat generating part 41 extends from the first slope 131B to the top part 130. The upstream end of each heat generating part 41 in the sub-scanning direction y is located on the top part 130, and the downstream end on the first slope 131B. In one example, around 10% to 30% of the overall dimension of each heat generating part 41 in the sub-scanning direction y is located on the top part 130.

The wiring layer 3 forms a conductive path for passing electric current to the heat generating parts 41. The wiring layer 3 is supported by the head substrate 1. As shown in FIGS. 5 and 6, the wiring layer 3 of this embodiment is stacked on the resistive layer 4.

As shown in FIGS. 1 to 3, 5 and 6, the wiring layer 3 includes a plurality of individual electrodes 31 and a common electrode 32.

As shown in FIGS. 2, 3 and 6, each individual electrode 31 has the shape of a strip generally extending in the sub-scanning direction y. The individual electrodes 31 are located upstream from the respective heat generating parts 41 in the sub-scanning direction y. The downstream end of each individual electrode 31 in the sub-scanning direction y overlaps with the upstream end of the top part 130 of the ridge 13 in the sub-scanning direction y. As shown in FIGS. 2 and 5, each individual electrode 31 has an individual-electrode pad 311. The individual-electrode pad 311 is where a wire 61 is bonded for electrical connection to a driver IC 7.

As shown in FIGS. 2, 3, 5 and 6, the common electrode 32 has a connecting part 323 and a plurality of strip parts 324. The strip parts 324 are located downstream from the respective heat generating parts 41 in the sub-scanning direction y. The upstream end of each strip part 324 in the sub-scanning direction y is located opposite the downstream end of the corresponding individual electrode 31 in the sub-scanning direction y across the corresponding heat generating part 41. The upstream end of each strip part 324 in the sub-scanning direction y overlaps with the first slope 131B of the ridge 13. The connecting part 323 that connects the strip parts 324 is located downstream from the strip parts 324 in the sub-scanning direction y. The connecting part 323 is elongated in the main scanning direction x, and has a dimension in the sub-scanning direction y which is greater, in other words wider, than the dimension of each strip part 324 in the main scanning direction x. As shown in FIG. 1, the connecting part 323 includes a pair of opposite end portions spaced apart from each other in the main scanning direction x, where each of the opposite end portions extends in the sub-scanning direction y from a downstream side to an upstream side of the heat generating parts 41. According to this embodiment, the downstream ends of the strip parts 324 and the connecting part 323 of the common electrodes 32 are disposed on the first obverse surface 11 of the head substrate 1 (in other words, above the first obverse surface 11 of the head substrate 1).

The wiring layer 3 (the individual electrodes 31 and the common electrode 32) is composed of a first conductive layer 301 and a second conductive layer 302 stacked in the thickness direction z.

The first conductive layer 301 is disposed on the resistive layer 4. The first conductive layer 301 is made of a material having a resistivity that is lower than the resistive layer 4 and higher than the second conductive layer 302. Preferably, the first conductive layer 301 has an electrical resistivity from $10^{-6}$ to $10^{-7}$ Ωm, for example. Preferably, in addition, the first conductive layer 301 has a heat conductivity lower than 100 W/m, for example. The first conductive layer 301 may be made of titanium (Ti) in one example, and other suitable materials include Ta, Ga, Sn, PtIr, Pt, thallium (TI), vanadium (V) and Cr. The first conductive layer 301 can be formed by any suitable process, such as sputtering, CVD, and plating, depending on the material used. For example, when the material is Ti, the first conductive layer 301 can be formed by sputtering. The thickness of the first conductive layer 301 is not specifically limited. In one example, the thickness of the first conductive layer 301 is from 0.1 to 0.2 μm.

The second conductive layer 302 is disposed on the first conductive layer 301. The second conductive layer 302 covers a part of the first conductive layer 301. As such, a part of the first conductive layer 301 is exposed from the second conductive layer 302. The second conductive layer 302 is made of a material having a lower resistivity than the resistive layer 4 and the first conductive layer 301. Preferably, the second conductive layer 302 has an electrical resistivity of $10^{-7}$ Ωm or lower. In addition, the second conductive layer 302 is made of a material that is more heat conductive than the first conductive layer 301. Preferably, the second conductive layer 302 has a heat conductivity of 100 W/m or higher, for example. The second conductive layer 302 may be made of Cu in one example, and other suitable materials include alloys of Cu, Al, alloys of Al, Au, Ag, Ni and tungsten (W). The second conductive layer 302 can be formed by any suitable process, such as sputtering, CVD, and plating, selected depending on the material used. For example, when the material is Cu, the second conductive layer 302 can be formed by sputtering. When the material is Au, Ag or Ni, the second conductive layer 302 is typically formed by plating. In this case, the second conductive layer 302 may include a seed layer (of Cu, for example). The second conductive layer 302 is thicker than the first conductive layer 301. The thickness of the second conductive layer 302 depends on the material used, the magnitude of current passed to the wiring layer 3, and so on. In one example, the thickness of the second conductive layer 302 is from 0.5 to 5 μm.

The wiring layer 3 includes a pair of heat generating sub-parts 35A and 35B and a pair of conductive parts 36A and 36B for each heat generating part 41.

Each pair of heat generating sub-parts 35A and 35B are formed by the parts of the first conductive layer 301 exposed from the second conductive layer 302. In other words, the heat generating sub-parts 35A and 35B are the parts of the wiring layer 3 where the first conductive layer 301 is not covered with the second conductive layer 302. The heat generating sub-parts 35A and 35B in each pair are adjacent to the opposite ends of the corresponding heat generating part 41 in the sub-scanning direction y. The heat generating sub-part 35A is adjacent to the heat generating part 41 on the upstream side in the sub-scanning direction y, and the heat generating sub-part 35B is adjacent to the heat generating part 41 on the downstream side in the sub-scanning direction y. The heat generating sub-part 35A is an example of "upstream-side heat generating sub-part", whereas the heat generating sub-part 35B an example of "downstream-side heat generating sub-part".

The heat generating sub-part 35A is located on the top part 130. The opposite ends of the heat generating sub-part 35A in the sub-scanning direction y are both located on the top part 130. The heat generating sub-part 35B extends from the first slope 131B to the second slope 132B. The upstream end of the heat generating sub-part 35B in the sub-scanning direction y is located on the first slope 131B, and the downstream end of the heat generating sub-part 35B in the sub-scanning direction y is located on the second slope 132B.

Each pair of conductive parts 36A and 36B is formed by the first conductive layer 301 and the second conductive layer 302. In other words, the conductive parts 36A and 36B are the parts of the wiring layer 3 where the second conductive layer 302 is stacked on the first conductive layer 301. The conductive parts 36A and 36B in each pair are respectively located on the sides of the heat generating sub-part 35A and 35B away from the corresponding heat generating part 41. The conductive part 36A is adjacent to the heat generating sub-part 35A on the upstream side in the sub-scanning direction y, and the conductive part 36B is adjacent to the heat generating sub-part 35B on the downstream side in the sub-scanning direction y. The conductive part 36A is an example of "upstream side conductive part", whereas the conductive part 36B is an example of "downstream conductive part".

The conductive part 36A extends from the top part 130 along the first slope 131A and the second slope 132A to reach a part of the first obverse surface 11 located upstream from the ridge 13 in the sub-scanning direction y. The downstream end of the conductive part 36A in the sub-scanning direction y is located on the top part 130. The conductive part 36B extends from the second slope 132B to a part of the first obverse surface 11 located downstream from the ridge 13 in the sub-scanning direction y. The upstream end of the conductive part 36B in the sub-scanning direction y is located on the second slope 132B.

Since the first conductive layer 301, the second conductive layer 302 and the resistive layer 4 have the resistance values satisfying the relation described above, the resistance value of the conductive parts 36A and 36B per unit length in the sub-scanning direction is lower than that of the heat generating parts 41. In addition, the resistance value of the heat generating sub-parts 35A and 35B per unit length in the sub-scanning direction falls between the resistance value of the heat generating part 41 and the resistance value of the conductive parts 36A and 36B. Consequently, when electric current is passed to each heat generating part 41, the amount of heat generated by each of the heat generating sub-parts 35A and 35B is smaller than the amount of heat generated by the heat generating part 41 and greater than the amount heat generated by each of the conductive parts 36A and 36B. For example, under the energization condition where the heat generating part 41 generates heat of around 300° C., each of the heat generating sub-parts 35A and 35B will generate heat of around 150 to 200° C.

The protective layer 2 covers and protects the wiring layer 3 and the resistive layer 4. The protective layer 2 is made of an insulating material. For example, the protective layer 2 may be made of silicon nitride (SiN), and other examples of the insulating material include silicon oxide ($SiO_2$), silicon carbide (SiC) aluminum nitride (AlN). The protective layer 2 may be composed of a single layer or two or more layers containing the insulating material. The thickness of the protective layer 2 is not specifically limited. In one example, the thickness of the protective layer 2 is from 0.1 to 10 μm.

The protective layer 2 has a plurality of pad openings 21 as shown in FIG. 5. Each pad opening 21 penetrates through the protective layer 2 in the thickness direction z. Through the pad openings 21, the individual-electrode pads 311 of the individual electrodes 31 are exposed. Unlike the illustrated example, the pad openings 21 may be filled with a conductive material. In this case, a plating layer may be disposed on the conductive material. The configuration of the plating layer is not limited. In one example, the plating layer is formed by laminating Ni, palladium (Pd) and Au on the surface of the conductive material in the stated order.

As shown in FIGS. 1 and 4, the connecting substrate 5 is located upstream from the head substrate 1 in the sub-scanning direction y. The connecting substrate 5 may be a printed circuit board for mounting the driver ICs 7 and a connector 59 (described later) thereon. The connecting substrate 5 is not limited to a specific shape. In this embodiment, the connecting substrate 5 has the shape of a rectangle elongated in the main scanning direction x. The connecting substrate 5 has a second obverse surface 51 and a second reverse surface 52. The second obverse surface 51 faces in the same direction as the first obverse surface 11 of the head substrate 1, and the second reverse surface 52 faces in the same direction as the first reverse surface 12 of the head substrate 1. In this embodiment, the second obverse surface 51 is located below the first obverse surface 11 in the thickness direction z in the figure.

The driver ICs 7 are mounted on the second obverse surface 51 of the connecting substrate 5 and selectively energize the heat generating parts 41. The driver ICs 7 are connected to the individual electrodes 31 with the wires 61. The driver ICs 7 controls energization of the heat generating parts 41 according to an external command signal provided to the thermal print head A1 through the connecting substrate 5. The driver ICs 7 are connected to the wiring pattern (not shown) of the connecting substrate 5 with a plurality of wires 62. The driver ICs 7 are provided as many as necessary for the number of heat generating parts 41.

The driver ICs 7 and the wires 61 and 62 are covered with the protective resin 78. The protective resin 78 is made of an insulating resin, which may be black. The protective resin 78 extends from the head substrate 1 to the connecting substrate 5.

The connector 59 connects the thermal print head A1 to the thermal printer Pr. The connector 59 is attached to the connecting substrate 5 and connected to the wiring pattern (not shown) of the connecting substrate 5.

The heat dissipating member 8 supports the head substrate 1 and the connecting substrate 5 and dissipates heat from the heat generating parts 41 to the outside via the head substrate 1. The heat dissipating member 8 may be a block of metal, such as A1. The heat dissipating member 8 has a first support surface 81 and a second support surface 82. The first support surface 81 and the second support surface 82 face upward in the thickness direction z and are arranged side by side in the sub-scanning direction y. The first support surface 81 is bonded to the first reverse surface 12 of the head substrate 1. The second support surface 82 is bonded to the second reverse surface 52 of the connecting substrate 5.

Next, an example of a method for manufacturing the thermal print head A1 is described below with reference to FIGS. 7 to 16.

Figure 7:
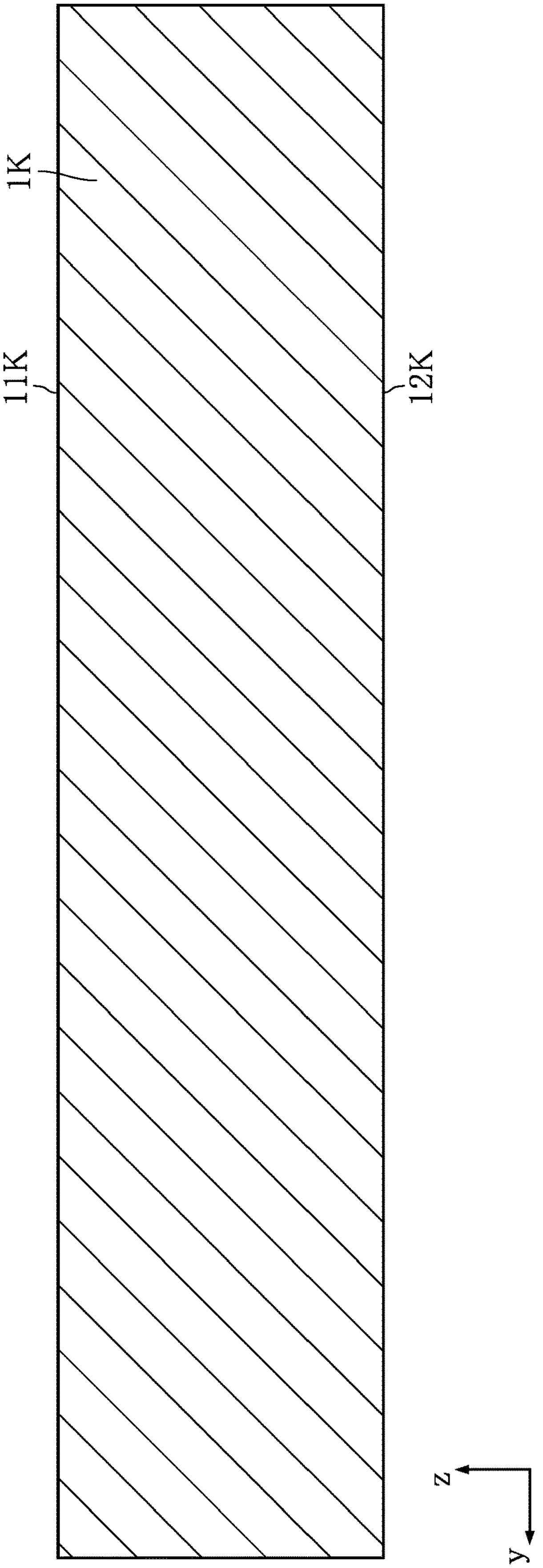
FIG. 7 is a fragmentary sectional view illustrating a step of a method for manufacturing the thermal print head according to the first embodiment.

First, a material substrate 1K is prepared as shown in FIG. 7. The material substrate 1K is made of a single crystal semiconductor. For example, the material substrate 1K is a part of a substantially circular Si wafer. That is, a single Si wafer includes a plurality of material substrates 1K. The figures mentioned below show one material substrate 1K (a head substrate 1) for manufacturing one thermal print head A1, out of the plurality of material substrates 1K included in the Si wafer. The thickness of the material substrate 1K (i.e., the thickness of the Si wafer) is not limited and may be about 725 μm in this embodiment. The material substrate 1K has a first obverse surface 11K and a first reverse surface 12K facing away from each other. The first obverse surface 11K has a (100) plane.

Figure 8:
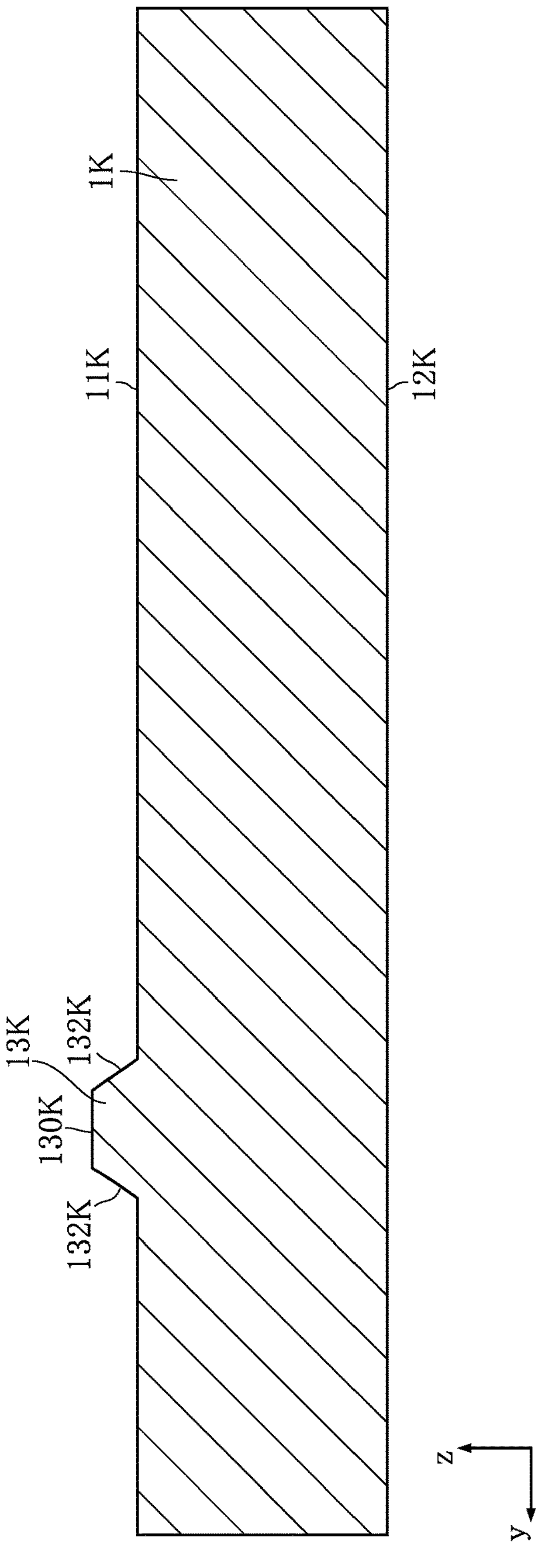
FIG. 8 is a fragmentary sectional view illustrating a step of the method for manufacturing the thermal print head according to the first embodiment.

Next, the first obverse surface 11K is covered with a mask layer and then anisotropically etched using KOH, for example. This provides the material substrate 1K with a ridge 13K as shown in FIG. 8. The ridge 13K is raised from the first obverse surface 11K and elongated in the main scanning direction x. The ridge 13K has a top part 130K and a pair of slopes 132K. The top part 130K is a surface parallel to the first obverse surface 11K and has a (100) plane as with the first obverse surface 11K. The pair of slopes 132K are located on the opposite sides of the top part 130K and connect the top part 130K to the first obverse surface 11K. Each slope 132K is a flat surface inclined relative to the top part 130K and the first obverse surface 11K. Each slope 132K forms an angle of 54.7 degrees with the first obverse surface 11K and also with the top part 130K.

Figure 9:
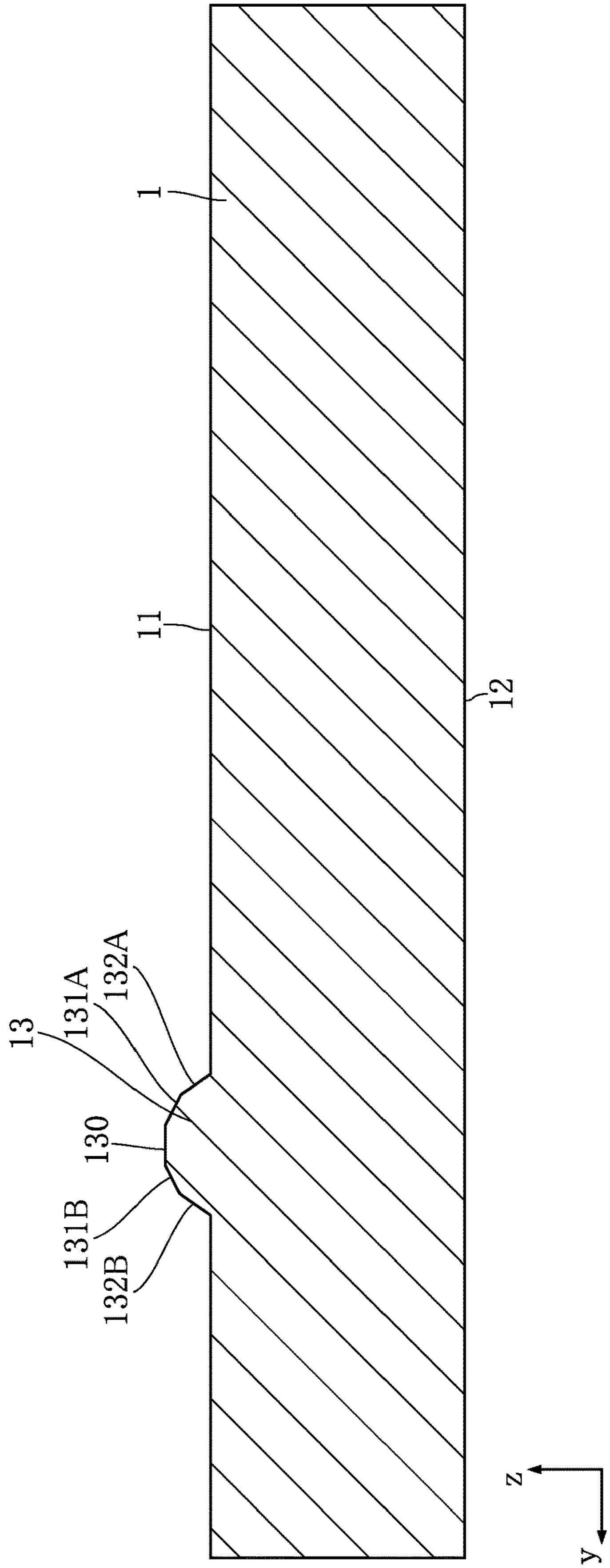
FIG. 9 is a fragmentary sectional view illustrating a step of the method for manufacturing the thermal print head according to the first embodiment.
Figure 10:
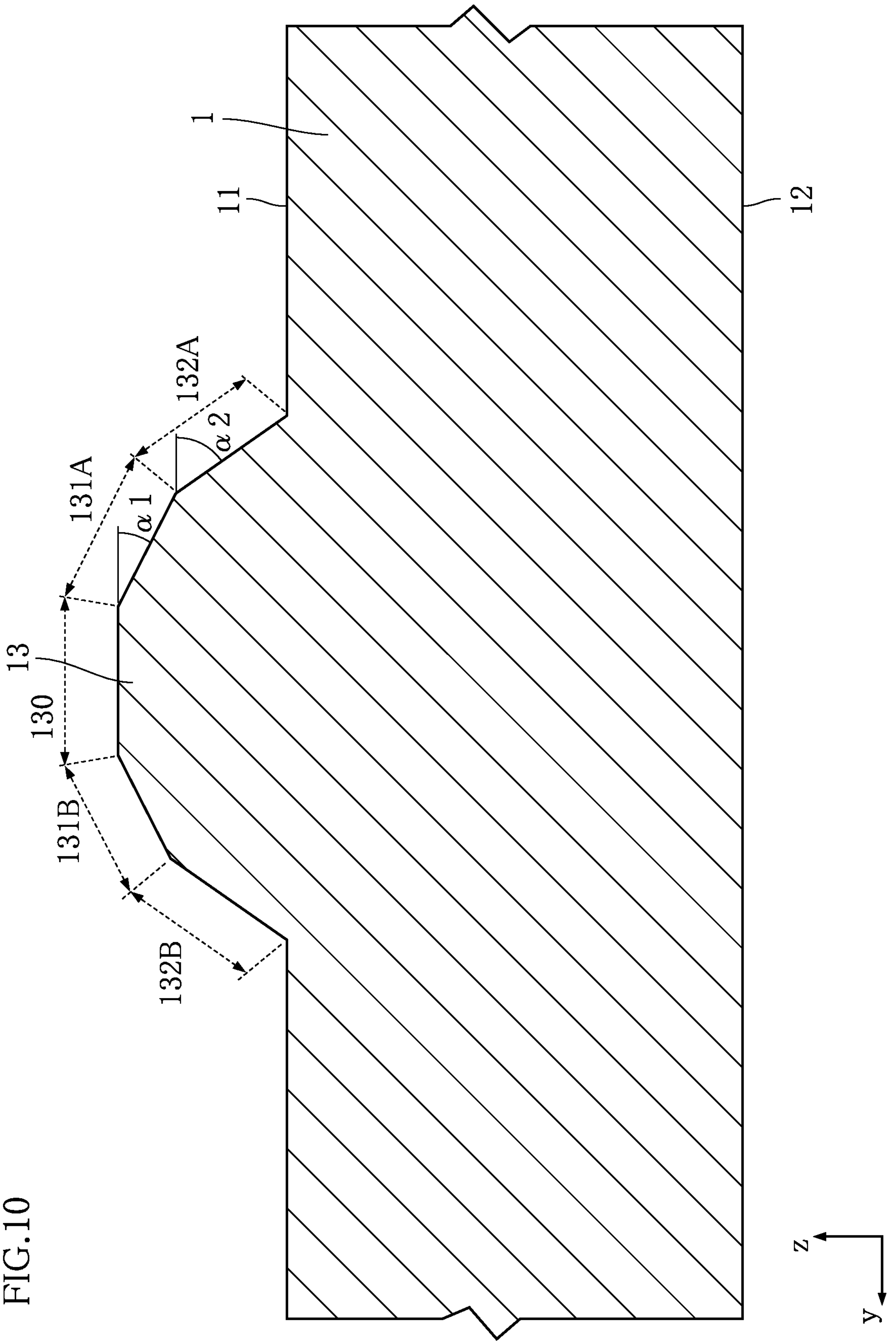
FIG. 10 is an enlarged fragmentary sectional view illustrating a step of the method for manufacturing the thermal print head according to the first embodiment.

Next, the mask layer is removed, followed by anisotropic etching using KOH, for example. Processing the material substrate 1K in this way provides a head substrate 1 having a first obverse surface 11, a first reverse surface 12 and a ridge 13 as shown in FIGS. 9 and 10. The ridge 13 has a top part 130, a pair of first slopes 131A and 131B, and a pair of second slopes 132A and 132B. The top part 130 is formed from the top part 130K, and the pair of second slopes 132A and 132B are formed from the slopes 132K. The first slopes 131A and 131B are formed by etching away the edges between the top part 130K and each slope 132K using KOH. The first slopes 131A and 131B each form an angle $\alpha 1$ (see FIG. 10) of 30.1 degrees to the first obverse surface 11. The second slopes 132A and 132B form an angle $\alpha 2$ (see FIG. 10) of 54.7 degrees to the first obverse surface 11. The step of forming the head substrate 1 from the material substrate 1K as described above (see FIGS. 8 to 10) is an example of "substrate processing step". The first obverse surface 11 and the ridge 13 are formed through the substrate processing step.

Figure 11:
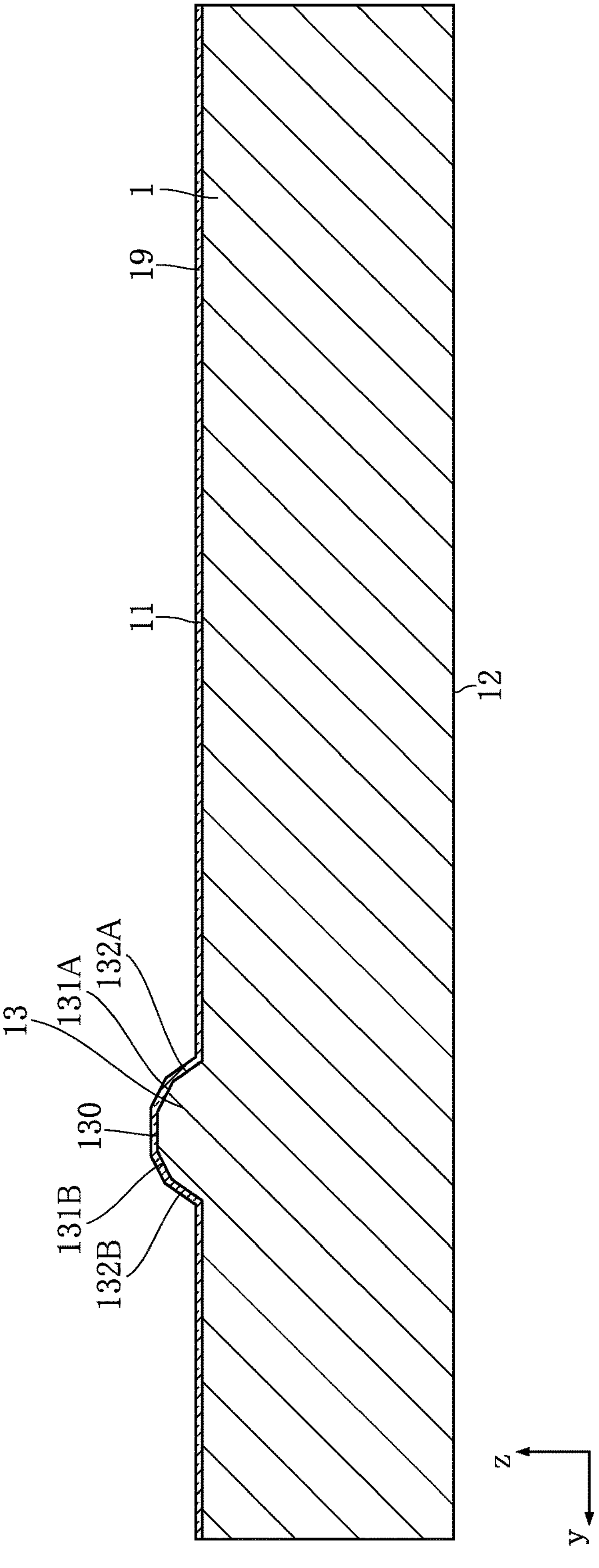
FIG. 11 is a fragmentary sectional view illustrating a step of the method for manufacturing the thermal print head according to the first embodiment.

Subsequently, an insulating layer 19 is formed as shown in FIG. 11. The insulating layer 19 is formed by depositing $SiO_2$ on the head substrate 1 by CVD using tetraethyl orthosilicate (TEOS) as a material gas. This process of forming the insulating layer 19 is merely an example, and a different process may be used.

Figure 12:
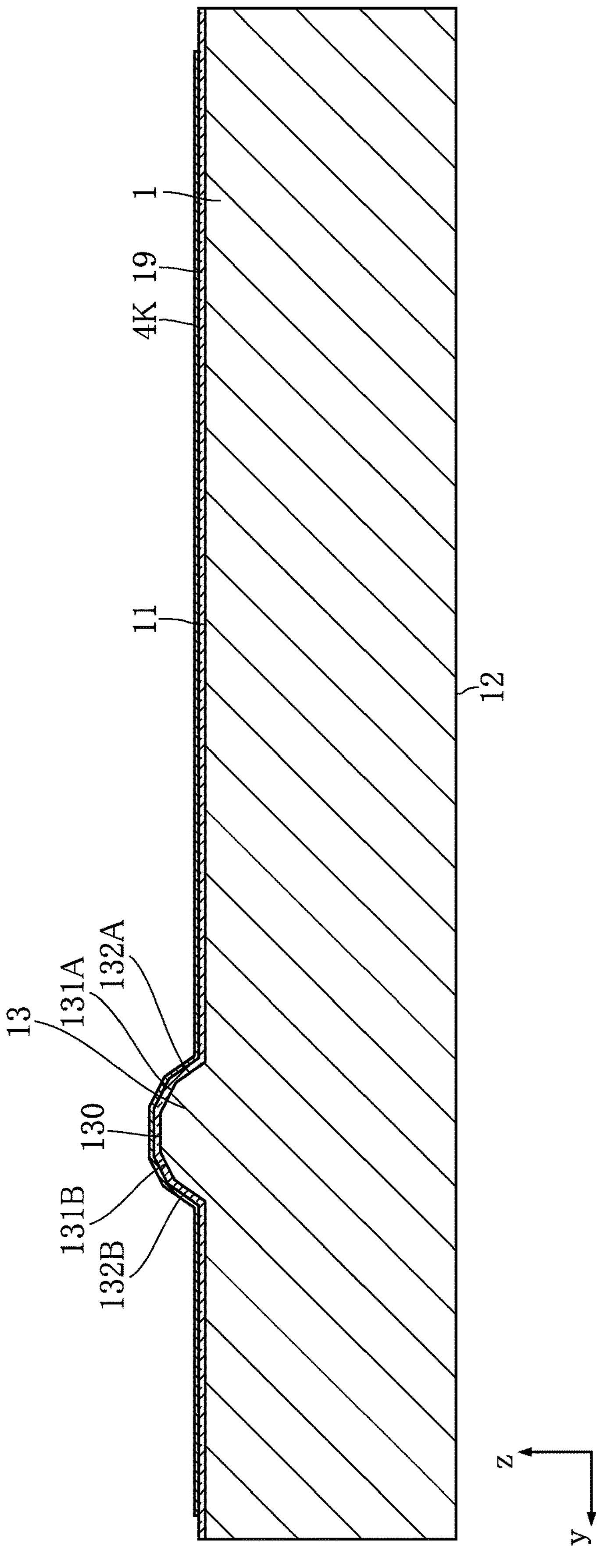
FIG. 12 is a fragmentary sectional view illustrating a step of the method for manufacturing the thermal print head according to the first embodiment.

Subsequently, a resistive film 4K is formed as shown in FIG. 12. The step of forming the resistive film 4K (the resistive film deposition step) may include depositing a thin TaN film on the insulating layer 19 by sputtering, for example. This process of forming the resistive film 4K is merely an example, and a different process may be used.

Figure 13:
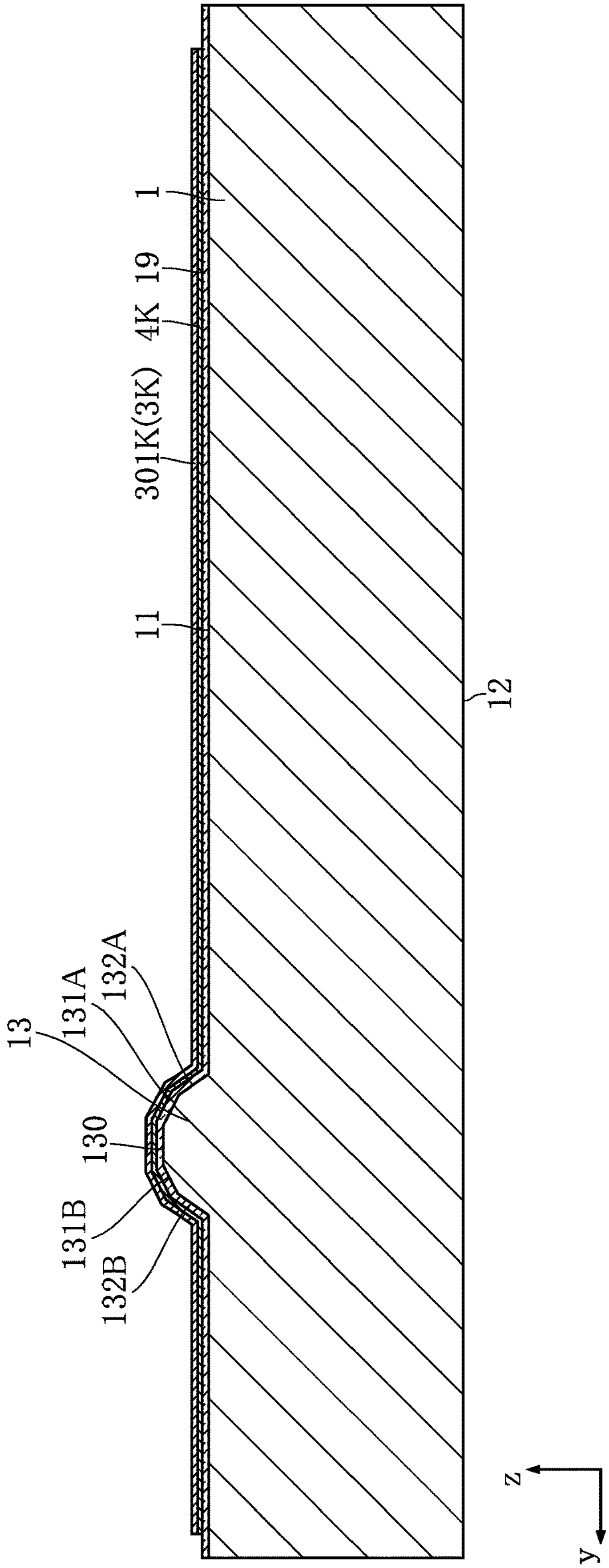
FIG. 13 is a fragmentary sectional view illustrating a step of the method for manufacturing the thermal print head according to the first embodiment.
Figure 14:
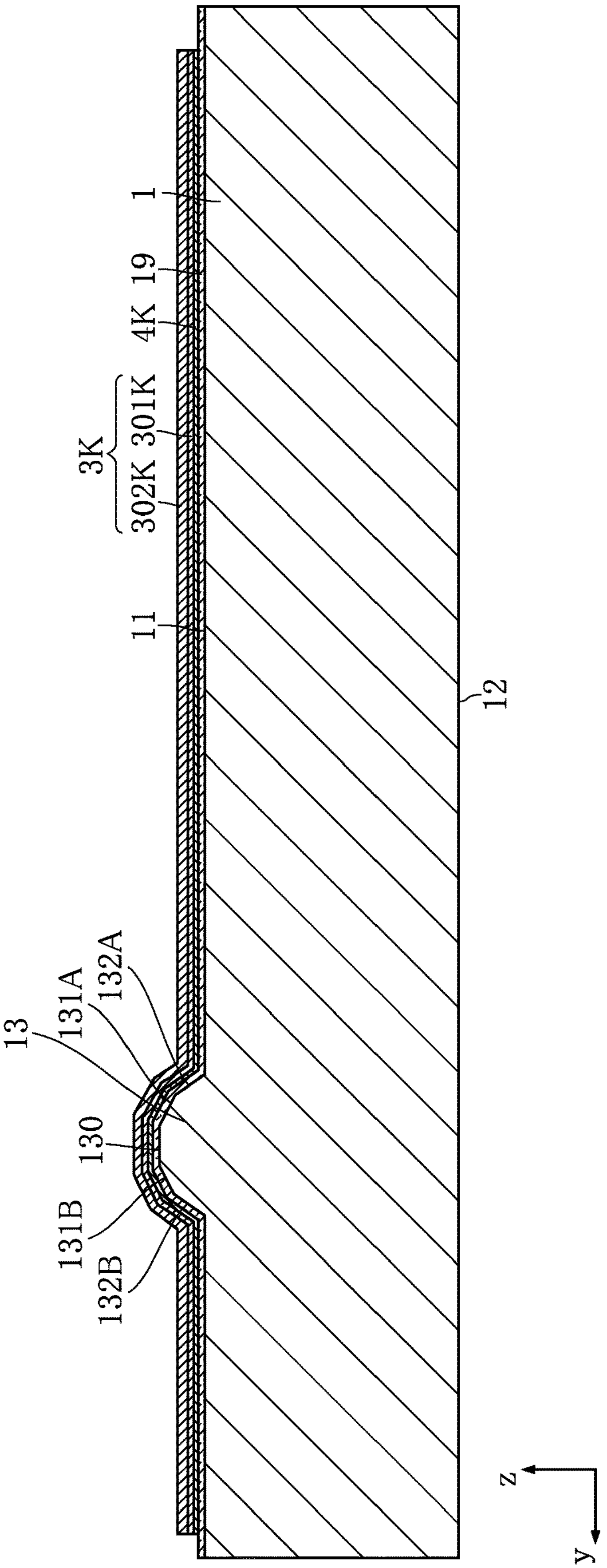
FIG. 14 is a fragmentary sectional view illustrating a step of the method for manufacturing the thermal print head according to the first embodiment.

Subsequently, a wiring film 3K is formed as shown in FIGS. 13 and 14. The step of forming the wiring film 3K includes two steps, one for forming a first conductive film 301K as shown in FIG. 13, and another for forming a second conductive film 302K as shown in FIG. 14. The step of forming the first conductive film 301K (the first deposition step) includes depositing a thin film of Ti on the resistive film 4K by sputtering, for example. At this stage, the conductive film 301K covers substantially the entire surface of the resistive film 4K. The step of forming the second conductive film 302K (the second deposition step) includes depositing a Cu film on the first conductive film 301K by sputtering or plating, for example. At this stage, the second conductive film 302K covers substantially the entire surface of the first conductive film 301K.

Figure 15:
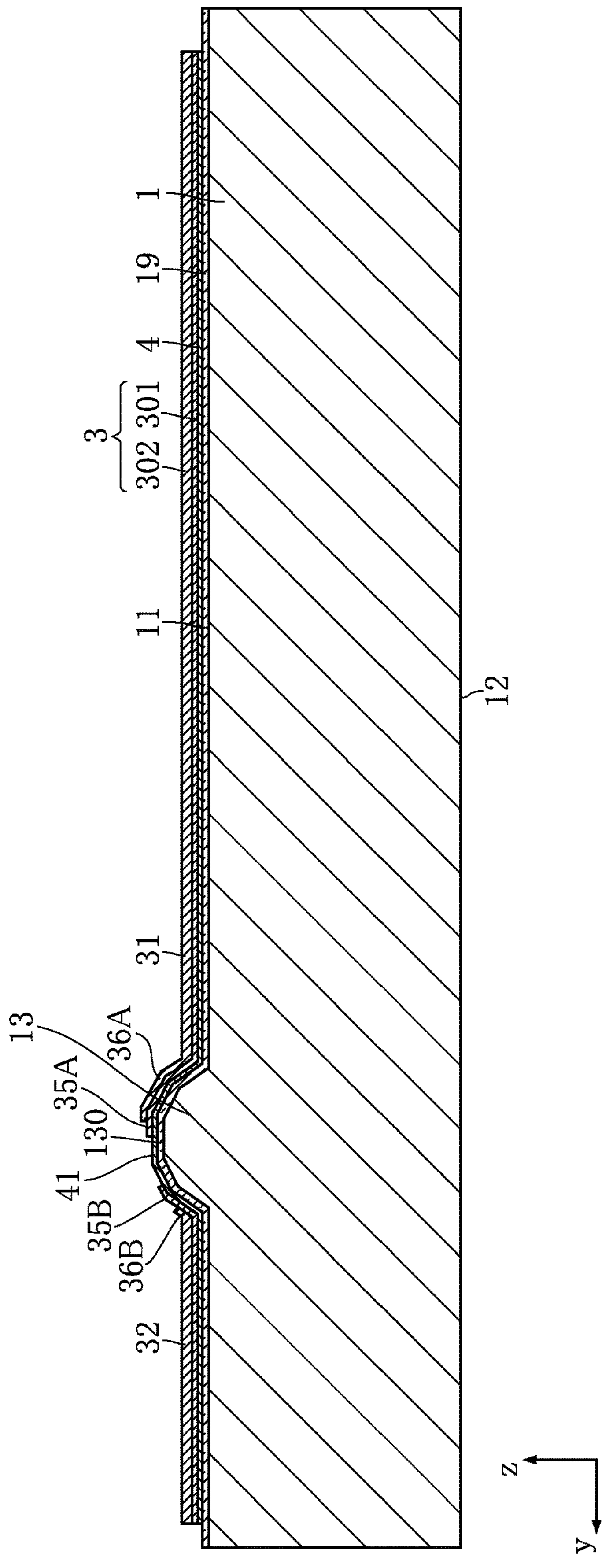
FIG. 15 is a fragmentary sectional view illustrating a step of the method for manufacturing the thermal print head according to the first embodiment.
Figure 16:
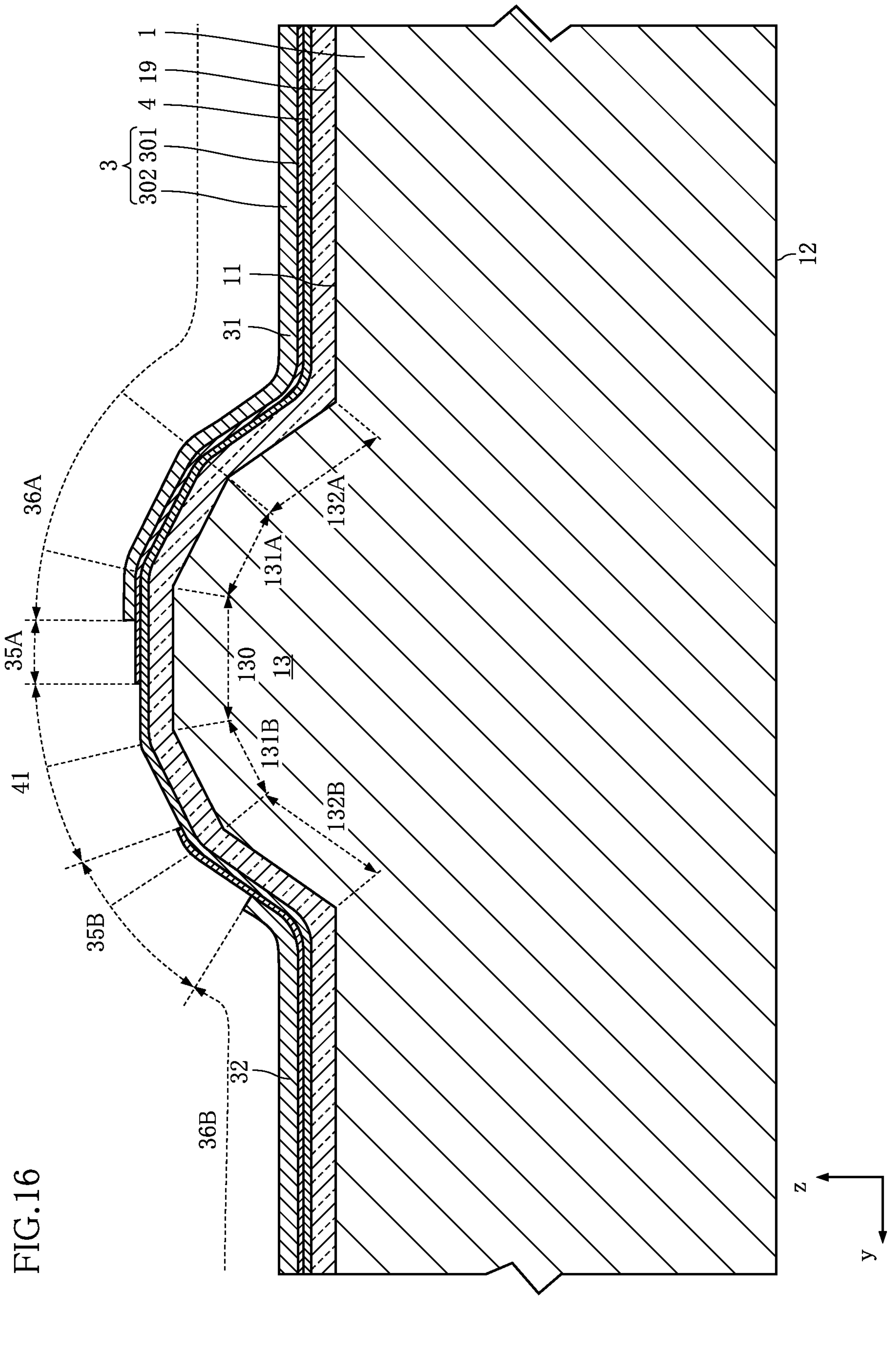
FIG. 16 is an enlarged fragmentary sectional view illustrating a step of the method for manufacturing the thermal print head according to the first embodiment.

Subsequently, as shown in FIGS. 15 and 16, a part of the second conductive film 302K is removed, followed by removing a part of the first conductive film 301K and then a part of the resistive film 4K. Each of the step of removing a part of the first conductive film 301K (the first partial removal step), the step of removing a part of the second conductive film 302K (the second partial removal step), and the step of removing a part of the resistive film 4K (the resistive film partial removal step) is done by etching, for example. By the first partial removal step, a first conductive layer 301 is formed. By the second deposition step, a second conductive layer 302 is formed. By the resistive film partial removal step, a resistive layer 4 is formed. That is, the step of forming the wiring layer 3 (the wiring layer forming step) includes the first deposition step, the second deposition step, the first partial removal step and the second partial removal step. The step of forming the resistive layer 4 (the resistive layer forming step) includes the resistive film deposition step and the resistive film partial removal step. Note that the resistive film partial removal step may be performed before the first and second deposition steps. The first conductive layer 301 and the second conductive layer 302 formed in this way together constitute the wiring layer 3 described above, and the wiring layer 3 includes a plurality of individual electrodes 31 and a common electrode 32. The wiring layer 3 also includes a plurality of heat generating sub-parts 35A and 35B and a plurality of conductive parts 36A and 36B. The resistive layer 4 formed in this way includes a plurality of heat generating parts 41.

Next, a protective layer 2 is formed. The protective layer 2 is formed by, for example CVD to deposit SiN on the insulating layer 19, the wiring layer 3 (the first conductive layer 301 and the second conductive layer 302) and the resistive layer 4. A plurality of pad openings 21 are formed by removing parts of the protective layer 2 by etching, for example. Subsequently, the head substrate 1 (FIGS. 1, 4, and 5), as well as other head substrates 1, is separated from the Si wafer by using a discing device, for example.

Subsequently, the head substrate 1 is subjected to assembling steps. The assembling steps may include attaching the head substrate 1 and a connecting substrate 5 to a heat dissipating member 8, mounting driver ICs 7 to the connecting substrate 5, and bonding a plurality of wires 61 and 62, and forming a protective resin 78. Then, the thermal print head A1 is completed as described above.

The thermal print head A1 described above has the following advantages.

According to the thermal print head A1, each of the heat generating sub-parts 35A and 35B is located between a heat generating part 41 and a conductive part 36A or 36B. When electric current is supplied, the temperature of the heat generating sub-parts 35A and 35B rises to a temperature lower than the temperature of the heat generating parts 41 and higher than the temperature of the conductive parts 36A and 36B. Consequently, the temperature gradient in the sub-scanning direction y is reduced, as compared with the case where the heat generating parts 41 are immediately adjacent to the conductive parts 36A and 36B. In the case where the heat generating parts 41 are immediately adjacent to the conductive parts 36A and 36B, the temperature difference around their boundaries can induce the thermal stress that would cause a break. In contrast, the thermal print head A1 is configured to prevent damage or breakage resulting from thermal stress, so that durability and reliability of the thermal print head A1 can be improved. In particular, providing a pair of heat generating sub-parts 35A and 35B at the opposite ends of each heat generating part 41 in the sub-scanning direction y is effective in reducing the temperature gradient and thus for improving reliability and durability.

According to the thermal print head A1, each heat generating parts 41 has a heat generating sub-part 35A on the upstream side in the sub-scanning direction y. Thus, a print medium fed in the sub-scanning direction y is first heated by the heat generating sub-parts 35A and then by the heat generating parts 41 that is elevated to a higher temperature. Although the heat generating sub-parts 35A generate higher-temperature heat than the conductive parts 36A, the temperature is about 150 to 200° C. under the energization conditions where the heat generating parts 41 generates heat of about 300° C. The temperature of this level is not enough to clearly change the color of thermal paper with standard sensitivity, considering the length of time (which is short) taken for the thermal paper to pass over the heat generating sub-parts 35A in the sub-scanning direction y. Yet, the thermal paper having been heated in advance by the heat generating sub-parts 35A undergoes change of color more promptly and clearly upon heating by the heat generating parts 41. This serves to improve print quality and print speed. In addition, the temperature of the heat generating parts 41 required for causing the color of a print medium to change can be lower than the temperature required when the heat generating sub-parts 35A are not present. The thermal print head A1 of this embodiment can therefore enhance energy efficiency, reduce the temperature gradient described above, reduce power consumption, and improve durability and reliability. This means that the energy load is not concentrated on the heat generating parts 41 but distributed to the heat generating sub-parts 35A. Consequently, degradation or deterioration of the heat generating parts 41 is reduced. In addition, since the temperature gradient described above is reduced, the thermal print head A1 can improve durability and reliability without decreasing printing efficiency. The thermal print head A1 can therefore achieve energy saving and longevity.

According to the thermal print head A1, the first conductive layer 301 is made of a material with lower thermally conductivity than the second conductive layer 302. This means that the heat generating sub-parts 35A can block the transfer of heat from the heat generating parts 41 to the conductive part 36A. Consequently, loss of heat generated by the heat generating parts 41 is reduced, so that energy efficiency and thermal response of the thermal print head A1 can be improved.

According to the thermal print head A1, the ridge 13 is composed of the top part 130, the first slopes 131A and 131B, and the second slopes 132A and 132B, where the first slopes 131A, 131B and the second slopes 132A, 132B are arranged in the sub-scanning directions y, with the top part 130 located in the middle. Thus, the ridge 13 has a configuration that slopes in two stages with respect to the top part 130 (the first obverse surface 11). With this configuration, the first slopes 131A and 131B can be inclined at a smaller angle $\alpha 1$ relative to the top part 130, which is preferable for improving print quality. A smaller angle $\alpha 1$ is also preferable for reducing wear of the protective layer 2 caused by a print medium passing over the protective layer 2. The thermal print head A1 can therefore improve print quality and longevity.

According to the thermal print head A1, the heat generating parts 41 are located on the first slope 131B. Consequently, the platen roller 91 can be arranged such that the center of contact 910 (see FIG. 4) with the heat generating parts 41 is offset downstream in the sub-scanning direction y from the ridge 13, without degrading print quality. With this arrangement, it is easier to avoid interference between the platen roller 91 and the protective resin 78, so that the dimension of the head substrate 1 in the sub-scanning direction y can be reduced.

According to the thermal print head A1, each heat generating part 41 extends from the first slope 131B to the top part 130. This arrangement allows for misalignment of the platen roller 91 in the sub-scanning direction y without degrading print quality.

According to the thermal print head A1, the heat generating sub-parts 35A are located on the top part 130 but not on the first slope 131A. In a configuration different from the thermal print head A1, the heat generating sub-parts 35 may be disposed to extend from the top part 130 to the first slope 131A. Such a configuration aims to allow for misalignment of the platen roller 91 in the sub-scanning direction y. With recent improvements in manufacturing accuracy, however, the possibility is minimized that the center of contact 910 deviates to a position upstream from the top part 130 even if the platen roller 91 is misaligned in the sub-scanning direction y. In addition, the heat generating sub-parts 35A do not contribute much to printing, and energy loss increases with the size of heat generating sub-parts 35A. That is, the thermal print head A1 is configured to reduce energy loss and prevent the reduction of printing efficiency resulting from the energy loss, as compared with the configuration in which the heat generating sub-parts 35A extend from the top part 130 to the first slope 131A. In other words, the thermal print head A1 is provided with the heat generating sub-parts 35A to reduce the temperature gradient, and yet the size (formation areas) of the heat generating sub-parts 35A is arranged to reduce or minimize reduction of printing efficiency resulting from energy loss.

According to the thermal print head A1, since the common electrode 32 is located on the downstream side of the heat generating parts 41 in the sub-scanning direction y, the individual electrodes 31 are located on the upstream side separately from the common electrode 32. As such, the pitch of the individual electrodes 31 in the main scanning direction x can be reduced to increase he printing resolution.

According to one example of the thermal print head A1, the first conductive layer 301 is made of Ti, and the second conductive layer 302 is made of Cu. This means that the resistance value per unit length in the sub-scanning direction y is higher at the heat generating sub-parts 35A and 35B where the first conductive layer 301 is not covered with the second conductive layer 302 than at the conductive parts 36A and 36B where the first conductive layer 301 and the second conductive layer 302 are stacked. In addition, the first conductive layer 301 is thinner than the second conductive layer 302, and thus the cross section of the wiring layer 3 is smaller at the heat generating sub-parts 35A and 35B than at the conductive parts 36A and 36B. This also contribute to the configuration that the resistance value per unit length in the sub-scanning direction y is higher at the heat generating sub-parts 35A and 35B than at the conductive parts 36A and 36B.

FIGS. 17 to 20 show a thermal print head B1 according to a second embodiment.

Figure 17:
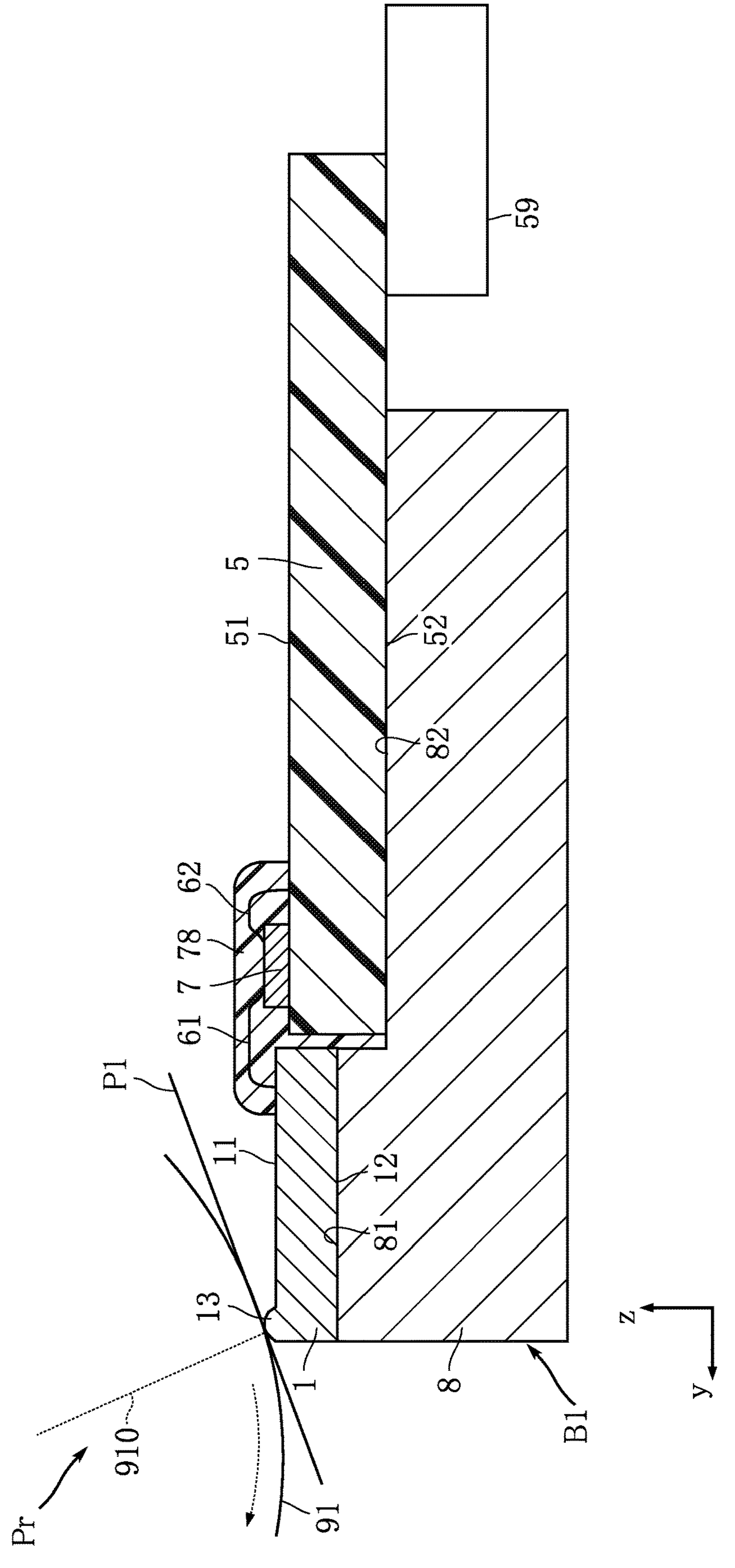
FIG. 17 is an enlarged fragmentary sectional view showing a thermal printer that includes a thermal print head according to a second embodiment.
Figure 18:
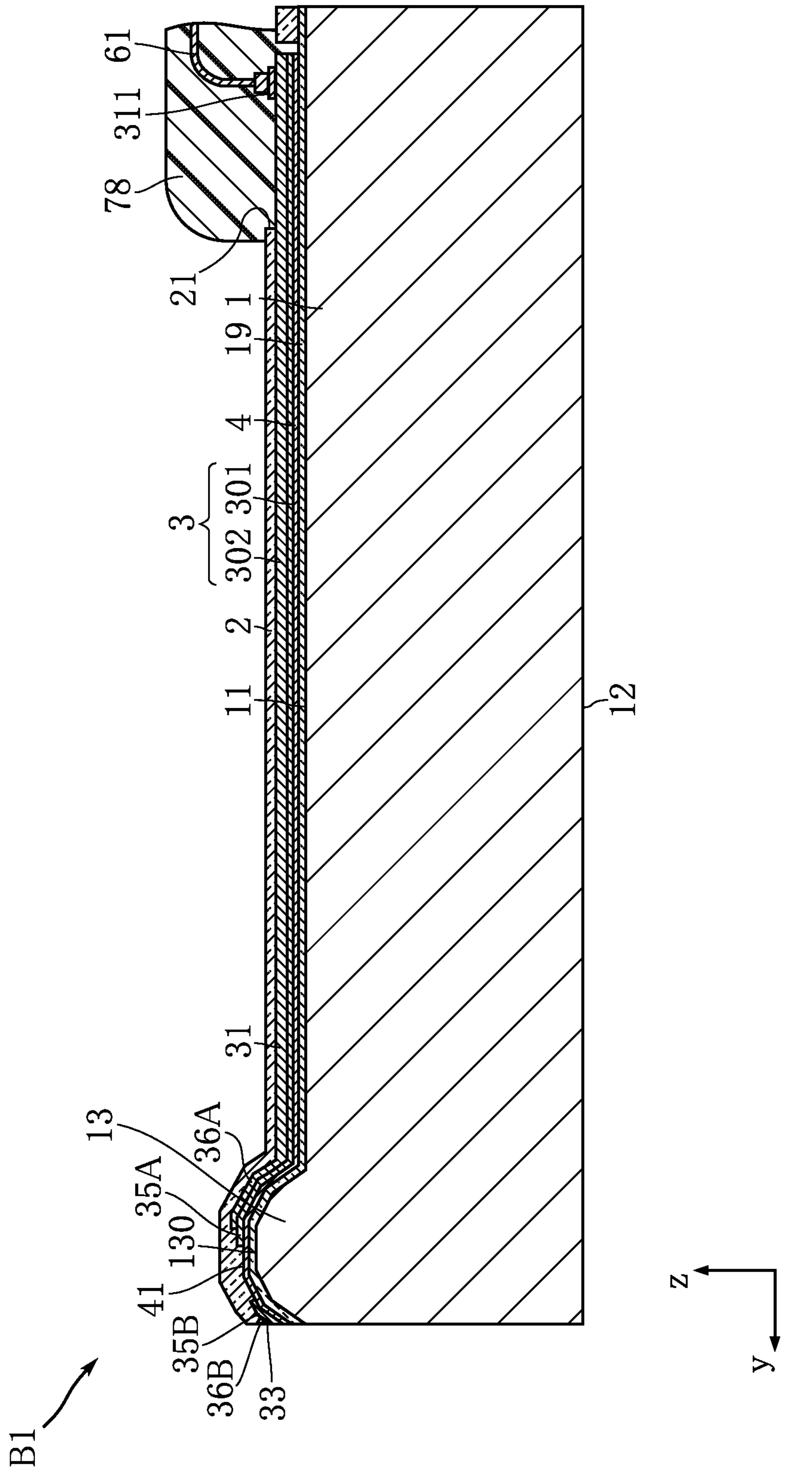
FIG. 18 is an enlarged fragmentary sectional view of FIG. 17.
Figure 19:
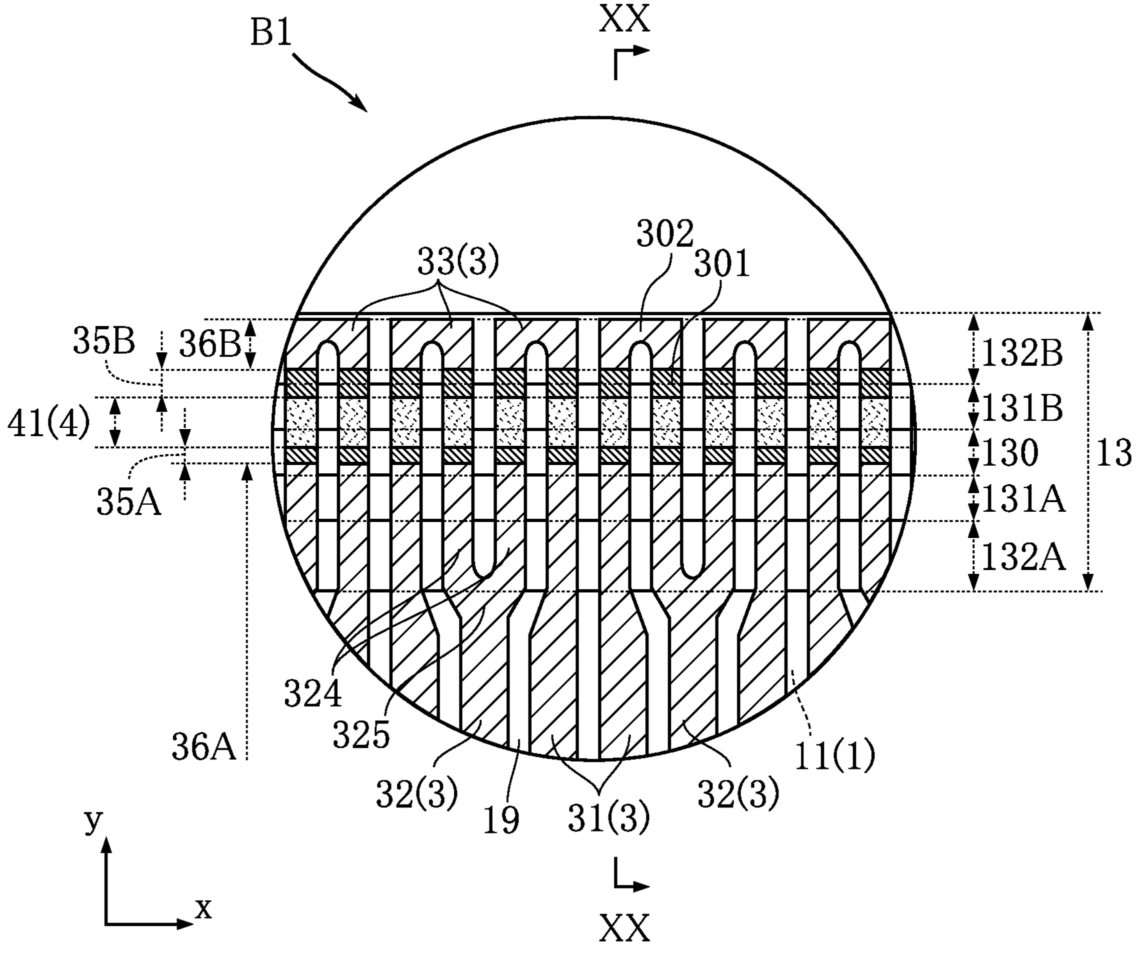
FIG. 19 is an enlarged fragmentary plan view of the thermal print head according to the second embodiment.
Figure 20:
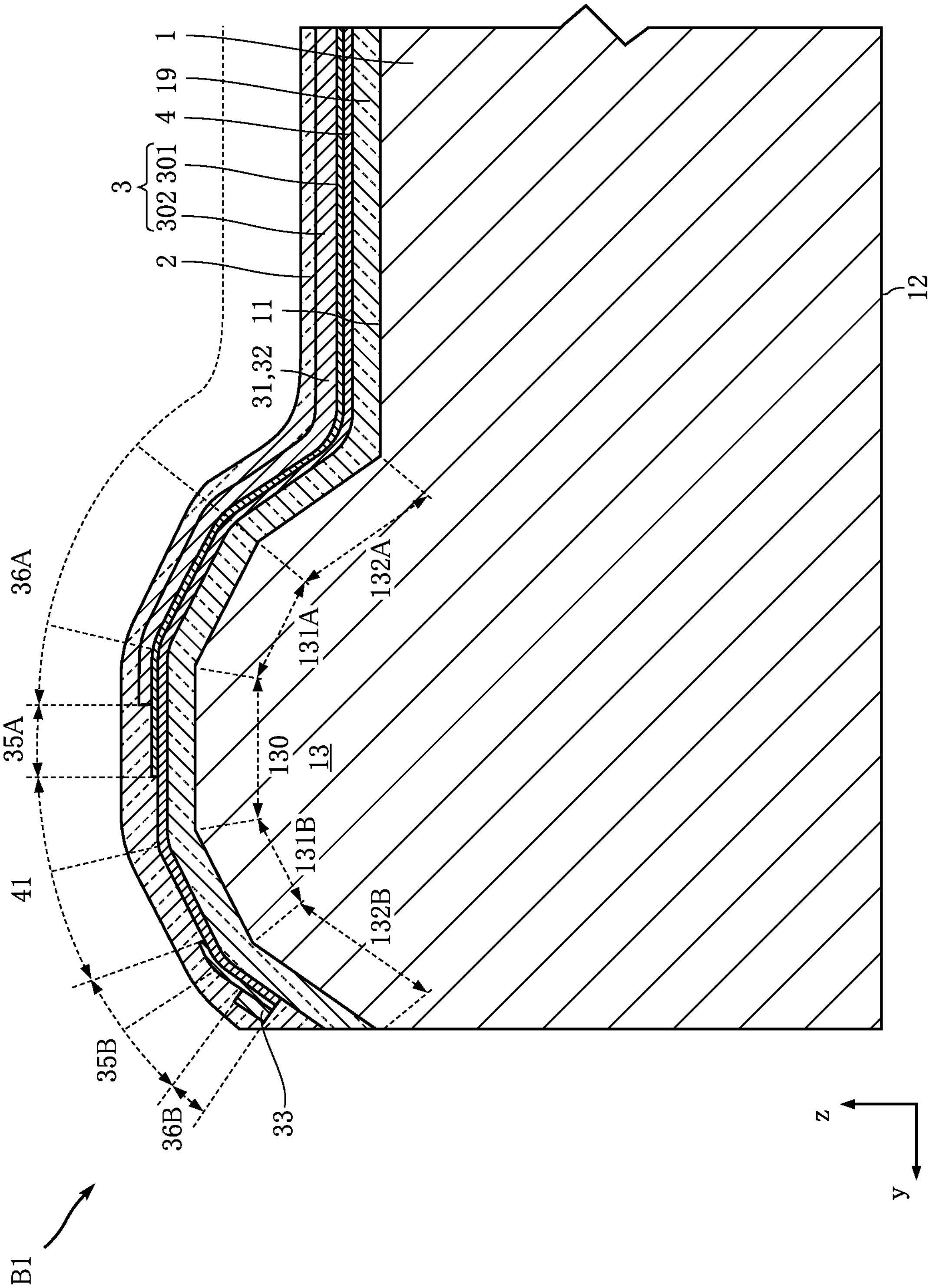
FIG. 20 is a sectional view taken along line XX-XX of FIG. 19.

FIG. 17 is an enlarged fragmentary sectional view showing a thermal printer Pr installed with the thermal print head B1. This figure corresponds to FIG. 4 showing the sectional view of the first embodiment. FIG. 18 is a fragmentary sectional view showing the thermal print head B1 and corresponds to FIG. 5 showing the sectional view of the first embodiment. FIG. 19 is a fragmentary enlarged plan view of the thermal print head B1. FIG. 20 is an enlarged sectional view taken along line XX-XX of FIG. 19.

The thermal print head B1 includes the ridge 13 along the downstream edge of the head substrate 1 in the sub-scanning direction y. That is, no part of the first obverse surface 11 is located downstream from the ridge 13 in the sub-scanning direction y. Thus, the wiring layer 3 of this embodiment is arranged as shown in FIG. 20 to have the downstream end of each conductive part 36B overlapping with the second slope 132B.

As shown in FIG. 19, the wiring layer 3 of this embodiment includes a plurality of individual electrodes 31, a plurality of common electrodes 32 and a plurality of relay electrodes 33.

As shown in FIG. 19, the individual electrodes 31 and the common electrodes 32 are located on the upstream side of the heat generating parts 41 in the sub-scanning direction y. The relay electrodes 33 are located on the downstream side of the heat generating parts 41 in the sub-scanning direction y. The individual electrodes 31 and the common electrodes 32 are arranged substantially parallel to each other at predetermined pitch in the main scanning direction x. The relay electrodes 33 are arranged at a predetermined pitch in the main scanning direction x. Each relay electrode 33 is shaped to form a conductive path that is reversely bent in the sub-scanning direction y. Each relay electrode 33 extends from the first slope 131B to the second slope 132B of the ridge 13.

With reference to FIG. 19, the common electrodes 32 are described below referring to, as an exemplary example, the left one of the two common electrodes indicated by reference numeral 32(3). As shown in FIG. 19, the common electrode 32 has a branching part 325 and two adjacent strip parts 324. The two strip parts 324 are located at the downstream end of the common electrode 32 in the sub-scanning direction y. The branching part 325 is also a downstream part of the common electrode 32 as a whole and connected to the two strip parts 324. The branching part 325 is connected, via the two strip parts 324, to a pair of mutually adjacent heat generating parts 41 (the fourth and fifth ones from the left in FIG. 19) on the upstream side in the sub-scanning direction y. The two heat generating parts 41 are each connected to a part of a corresponding one of the two mutually adjacent relay electrodes 33 (i.e., to the part of each relay electrode 33 that is closer to the other relay electrode 33) on the downstream side in the sub-scanning direction y. The other part of each relay electrode 33 (the part of each relay electrode 33 that is away from the other relay electrode 33) is connected to a corresponding one of two other heat generating parts 41 (the third and sixth ones from the left in FIG. 19) on the downstream side in the sub-scanning direction y. That is, the common electrode 32 is connected to a first pair of mutually adjacent heat generating parts 41 (the fourth and fifth ones from the left in FIG. 19) and further to a second pair of heat generating parts 41 (the third and sixth ones from the left) flanking the first pair in the main scanning direction x (on the right and left in FIG. 19). The second pair of heat generating parts 41 are adjacent to two individual electrodes 31 (the two individual electrodes 31 flanking the exemplary common electrode 32).

According to the arrangement described above, one common electrode 32 forms two adjacent conductive paths. Each of the two conductive paths includes, in order of connection, the common electrode 32, i.e., one branching part 325 and one of two strip parts 324), a first heat generating part 41, a relay electrode 33 and a second heat generating part 41 adjacent to the first heat generating part 41, and an individual electrode 31. Energizing one individual electrode 31 will energize the two heat generating parts 41 that are adjacent to each other in the main scanning direction and electrically connected between the one individual electrode 31 and a common electrode 32. Such two adjacent heat generating parts 41 correspond to one dot on a print medium.

As shown in FIG. 17, the center of contact 910 between the platen roller 91 and each heat generating part 41 is positioned downstream from the ridge 13 of the head substrate 1 in the sub-scanning direction y. That is, the platen roller 91 is pressed against the heat generating parts 41 disposed on the ridge 13 via the protective layer 2, at an angle inclined toward the downstream in the sub-scanning direction y.

Similarly to the thermal print head A1, the thermal print head B1 includes the heat generating sub-parts 35A and 35B each of which is located between a heat generating part 41 and a conductive part 36A or 36B. Consequently, the temperature gradient in the sub-scanning direction y is reduced, as compared within the case where the heat generating parts 41 are immediately adjacent to the conductive parts 36A and 36B. Similarly to the first embodiment, the thermal print head B1 can therefore improve durability and reliability.

According to the thermal print head B1, no part of the first obverse surface 11 is located downstream from the ridge 13 in the sub-scanning direction y. With this configuration, the downstream part of the head substrate 1 in the sub-scanning direction y can be shorter. Consequently, the possibility is reduced that a print medium being transported makes contact with a part of the head substrate 1 that is downstream from the ridge 13 in the sub-scanning direction y. This means that a print medium P1 can be fed through a straight path as shown in FIG. 17 without being curved or bent. This is preferable for providing a straight-path feeding mechanism to the thermal printer Pr installed with the thermal print head B1. The thermal printer Pr with the straight-path feeding mechanism can print on such a print medium as a plastic card having a thermal layer.

Figure 21:
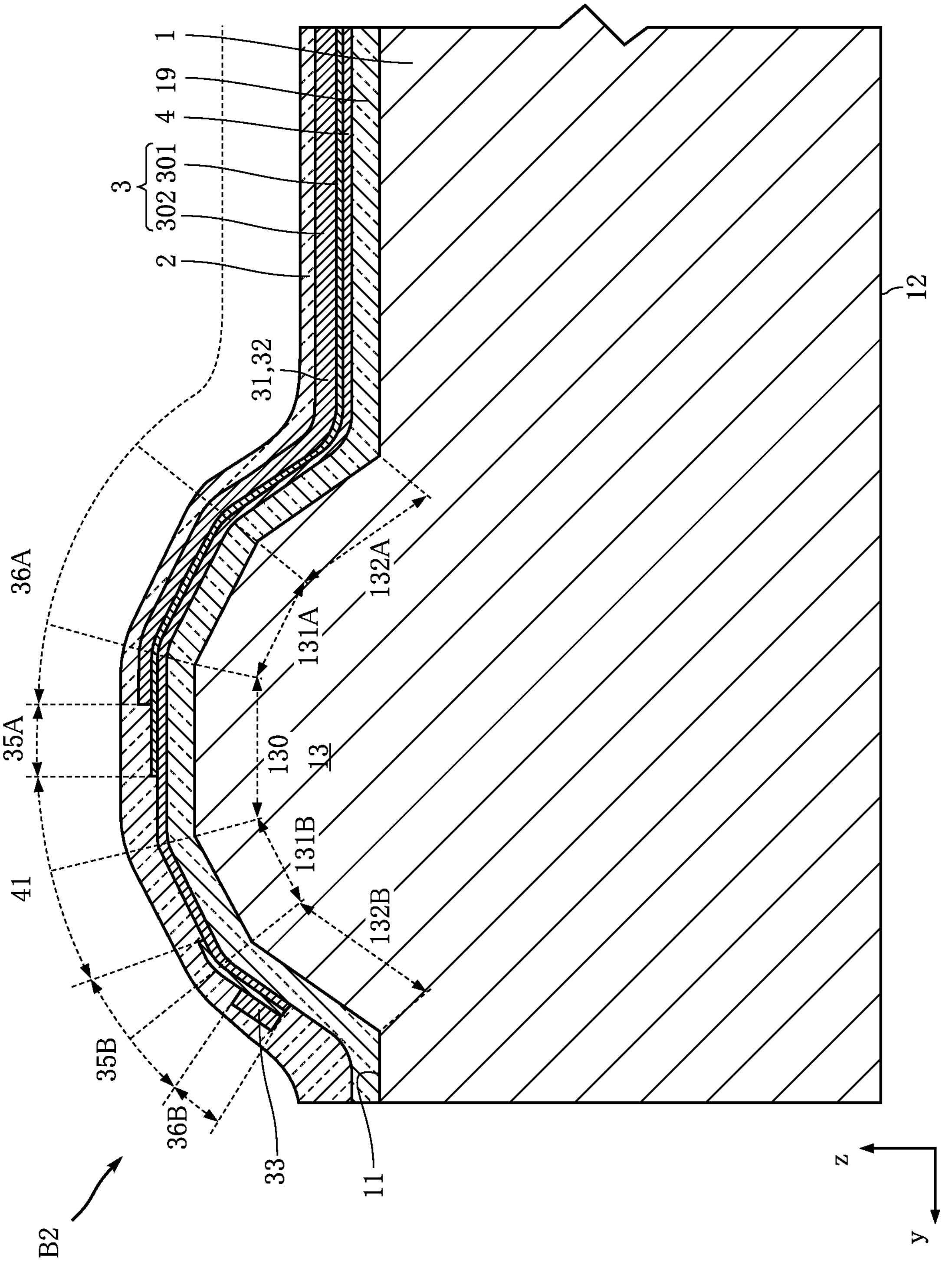
FIG. 21 is an enlarged fragmentary plan view of a thermal print head according to a variation of the second embodiment.

According to the second embodiment, no part of the first obverse surface 11 is located downstream from the ridge 13 in the sub-scanning direction y. However, the present disclosure is not limited to this. In one variation, the first obverse surface 11 may have a relatively small part located downstream from the ridge 13 in the sub-scanning direction y, as compared with the thermal print head A1. FIG. 21 is an enlarged fragmentary sectional view of a thermal print head B2 according to the variation. This figure corresponds to the sectional view shown in FIG. 20. According to the thermal print head B2, the first obverse surface 11 has a small part located downstream from the ridge 13 in the sub-scanning direction y. The thermal print head B2 can therefore achieve the same advantages as the thermal print head B1. That is, a print medium can be transported without making contact with a part of the head substrate 1 that is downstream from the ridge 13 in the sub-scanning direction y. Similarly to the thermal print head B1, the thermal print head B2 shown in FIG. 21 is preferable for providing a straight-path feeding mechanism.

Figure 22:
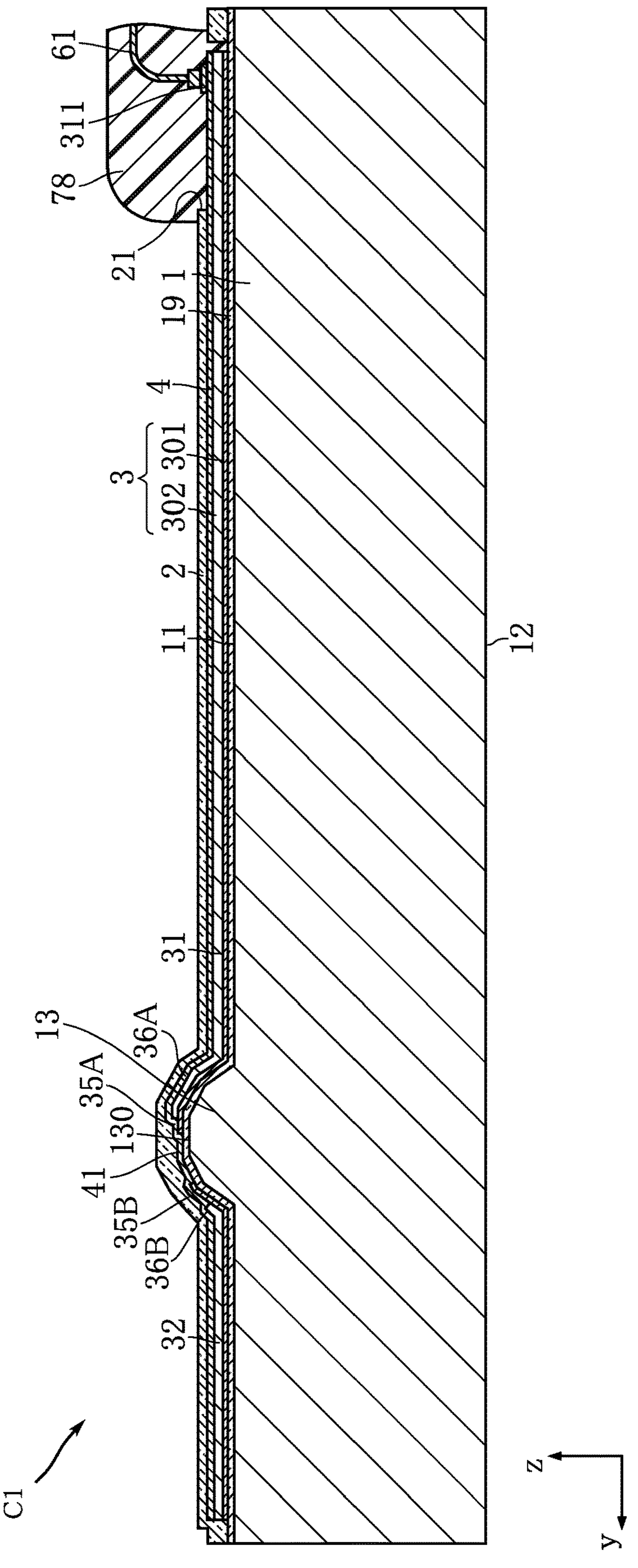
FIG. 22 is a fragmentary sectional view of a thermal print head according to a third embodiment.
Figure 23:
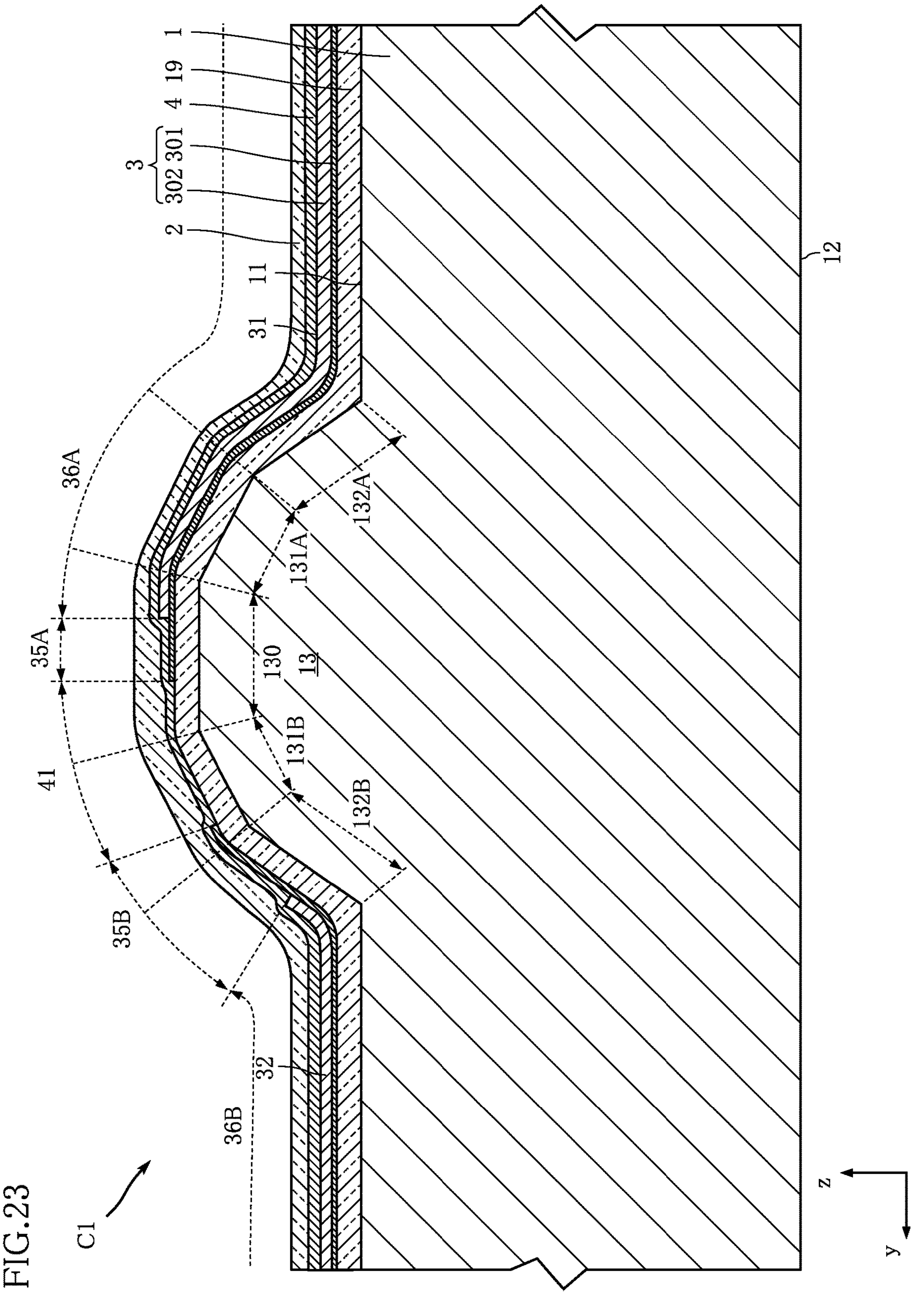
FIG. 23 is an enlarged fragmentary sectional view of the thermal print head according to the third embodiment.

FIGS. 22 and 23 show a thermal print head C1 according to a third embodiment. FIG. 22 is a fragmentary enlarged plan view of the thermal print head C1 and corresponds to FIG. 5. FIG. 23 is a fragmentary enlarged plan view of the thermal print head C1 and corresponds to FIG. 6.

As shown in FIGS. 22 and 23, the resistive layer 4 and the wiring layer 3 of the thermal print head C1 is stacked in a different order than those of the thermal print head A1. The thermal print head C1 includes the wiring layer 3 (the first conductive layer 301 and the second conductive layer 302) disposed on the head substrate 1 (the first obverse surface 11 and the ridge 13) via the insulating layer 19, and the resistive layer 4 disposed on the wiring layer 3.

In the method for manufacturing the thermal print head C1, the resistive layer 4 is formed after the wiring layer 3. Specifically, the method for manufacturing the thermal print head A1 is modified such that the step of forming the insulating layer 19 (see FIG. 11) is not followed by the resistive film deposition step but by the first deposition step and the second deposition step in the stated order. Then, the first partial removal step and the second partial removal step are performed. Through these steps, the wiring layer 3 (the first conductive layer 301 and the second conductive layer 302) is formed on the insulating layer 19. In other words, the wiring layer forming step is performed before the resistive film deposition step. Subsequently, the resistive film deposition step and the resistive film partial removal step are performed in the stated order. Through these steps, the resistive layer 4 is formed on the wiring layer 3 and also on the parts of the insulating layer 19 exposed from the wiring layer 3. Thereafter, the protective layer 2 is formed though the same steps as in the method for manufacturing the thermal print head A1.

Similarly to the thermal print head A1, the thermal print head C1 includes the heat generating sub-parts 35A and 35B each of which is located between a heat generating part 41 and a conductive part 36A or 36B. Consequently, the temperature gradient in the sub-scanning direction y is reduced, as compared with the case where the heat generating parts 41 are immediately adjacent to the conductive parts 36A and 36B. Similarly to the first embodiment, the thermal print head C1 can therefore improve durability and reliability.

According to the thermal print head C1, the wiring layer 3 (the first conductive layer 301 and the second conductive layer 302) and the resistive layer 4 are stacked on the insulating layer 19 in the stated order. That is, in the method for manufacturing the thermal print head C1, the resistive layer 4 is formed after the wiring layer 3 is formed on the insulating layer 19. In the method for manufacturing the thermal print head A1, the resistive film 4K, the first conductive film 301K and the second conductive film 302K are deposited in the stated order, and then parts of the first conductive film 301K and the second conductive film 302K are removed by etching, for example. Since the etching of the resistive film 4K, the first conductive film 301K and the second conductive film 302K is sequentially performed after all of these films are deposited, the transportation work between the deposition apparatus and the etching apparatus is reduced. However, when each of the first conductive film 301K and the second conductive film 302K is etched, the resistive film 4K is also placed in the environment for the etching. The resistive film 4K may be damaged, depending on the material of the resistive film 4K or the process used for etching each of the first conductive film 301K and the second conductive film 302K. In contrast, according to the thermal print head C1, the resistive film 4K (the resistive layer 4) is formed after the first conductive layer 301 and the second conductive layer 302 are processed (in the first partial removal step and the second partial removal step) and thus without a risk of damaging the resistive film 4K. The present embodiment can therefore reduce the risk of damaging the resistive layer 4 (the heat generating parts 41) during processing.

Figure 24:
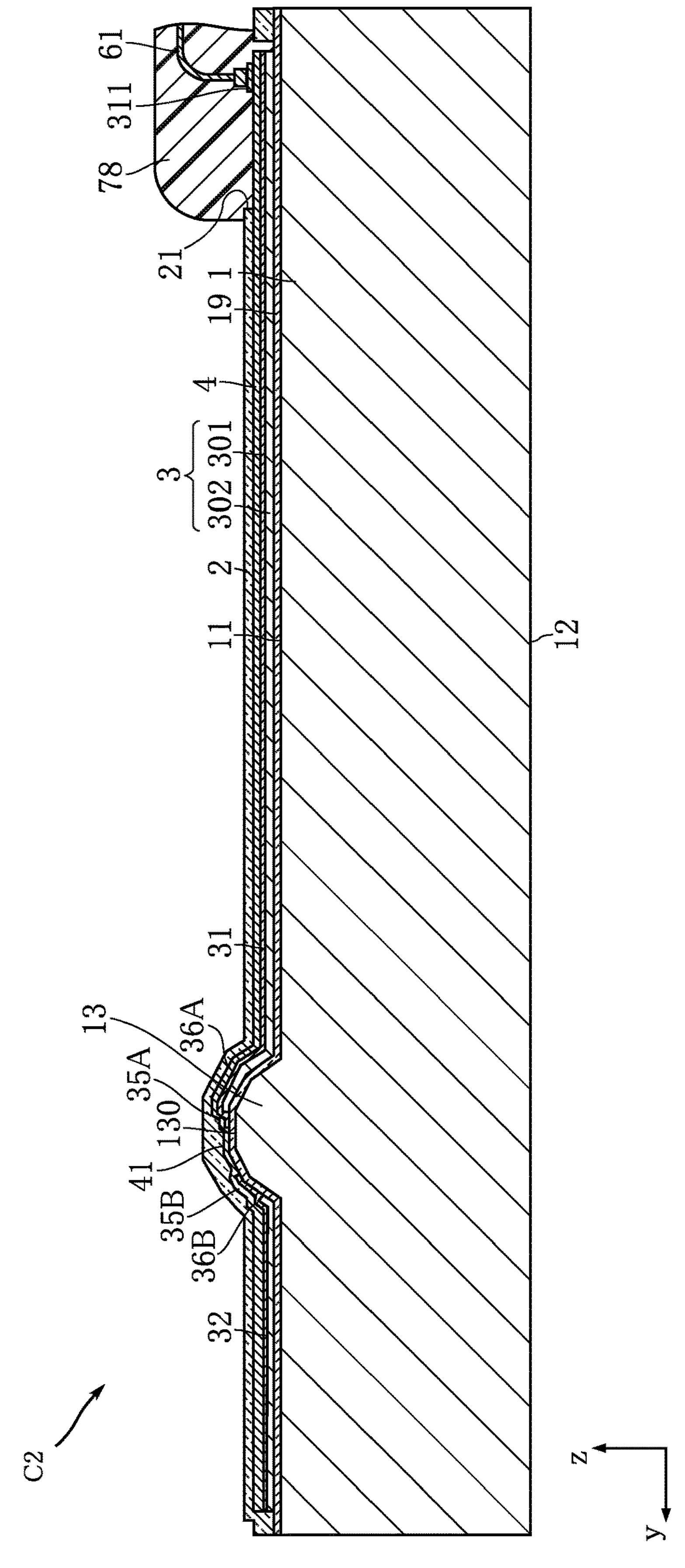
FIG. 24 is a fragmentary sectional view of a thermal print head according to a variation of the third embodiment.
Figure 25:
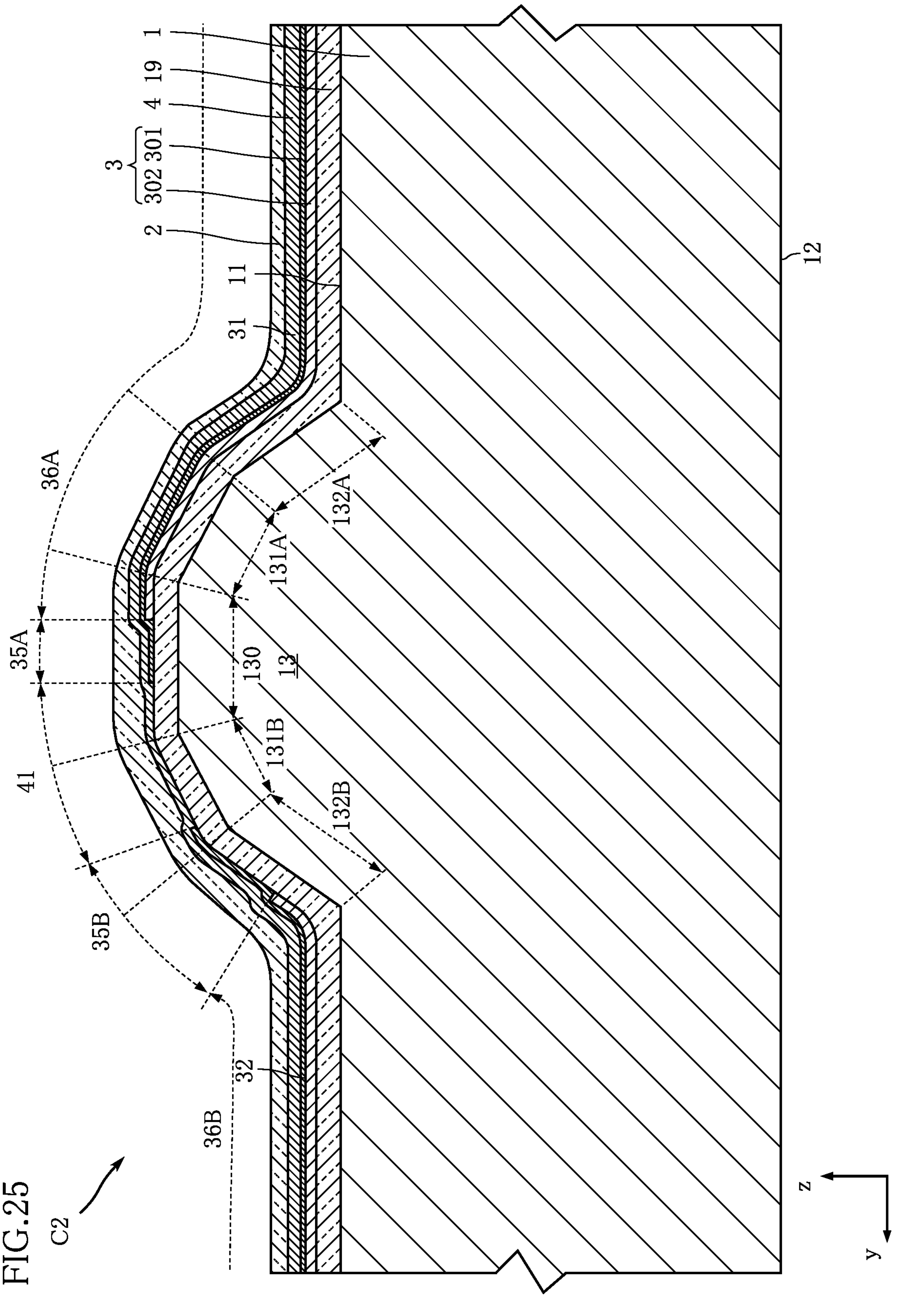
FIG. 25 is an enlarged fragmentary sectional view of a thermal print head according to the variation of the third embodiment.

According to the third embodiment, the first conductive layer 301 and the second conductive layer 302 may be stacked in reverse of the order described above. FIGS. 24 and 25 show a thermal print head C2 according to such a variation. FIG. 24 is a fragmentary enlarged plan view of the thermal print head C2 and corresponds to FIG. 22. FIG. 25 is a fragmentary enlarged plan view of the thermal print head C2 and corresponds to FIG. 23.

As shown in FIGS. 24 and 25, the thermal print head C2 includes the wiring layer 3 formed by stacking the second conductive layer 302 and the first conductive layer 301 on the insulating layer 19 in the state order, and the resistive layer 4 is stacked on the first conductive layer 301. According to the thermal print head C2, the heat generating sub-parts 35A and 35B are formed by parts of the first conductive layer 301 not stacked on the second conductive layer 302, in other words, by parts of the first conductive layer 301 that are in contact with the insulating layer 19.

The thermal print head C2 can achieve the same advantages as the thermal print head C1.

According to the thermal print heads C1 and C2 shown in FIGS. 22 and 24, the resistive layer 4 is interposed between the individual-electrode pads 311 and the wiring layer 3. The resistive layer 4, however, does not significantly affect the electrical continuity between each individual-electrode pad 311 and the wiring layer 3 due to the size of each individual-electrode pad 311 in plan view and the small thickness of the resistive layer 4. Yet, for better electrical continuity, it is preferable not to place the resistive layer 4 between the wiring layer 3 and the individual-electrode pads 311.

The thermal print heads C1 and C2 may also be modified such that no part of the first obverse surface 11 is located downstream from the ridge 13 in the sub-scanning direction y as in the second embodiment (FIG. 20), or only a small part of the first obverse surface 11 is located downstream as in the variation of the second embodiment (FIG. 21).

Figure 26:
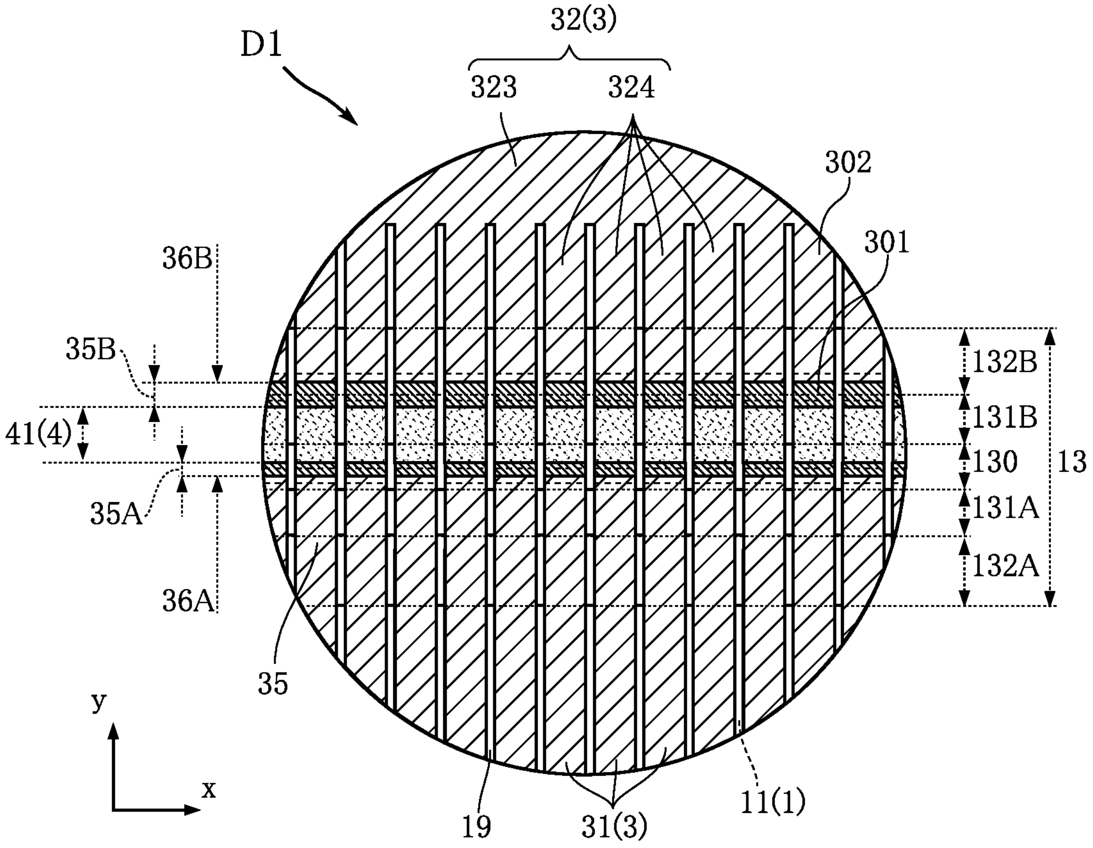
FIG. 26 is an enlarged fragmentary plan view of a thermal print head according to a fourth embodiment.
Figure 27:
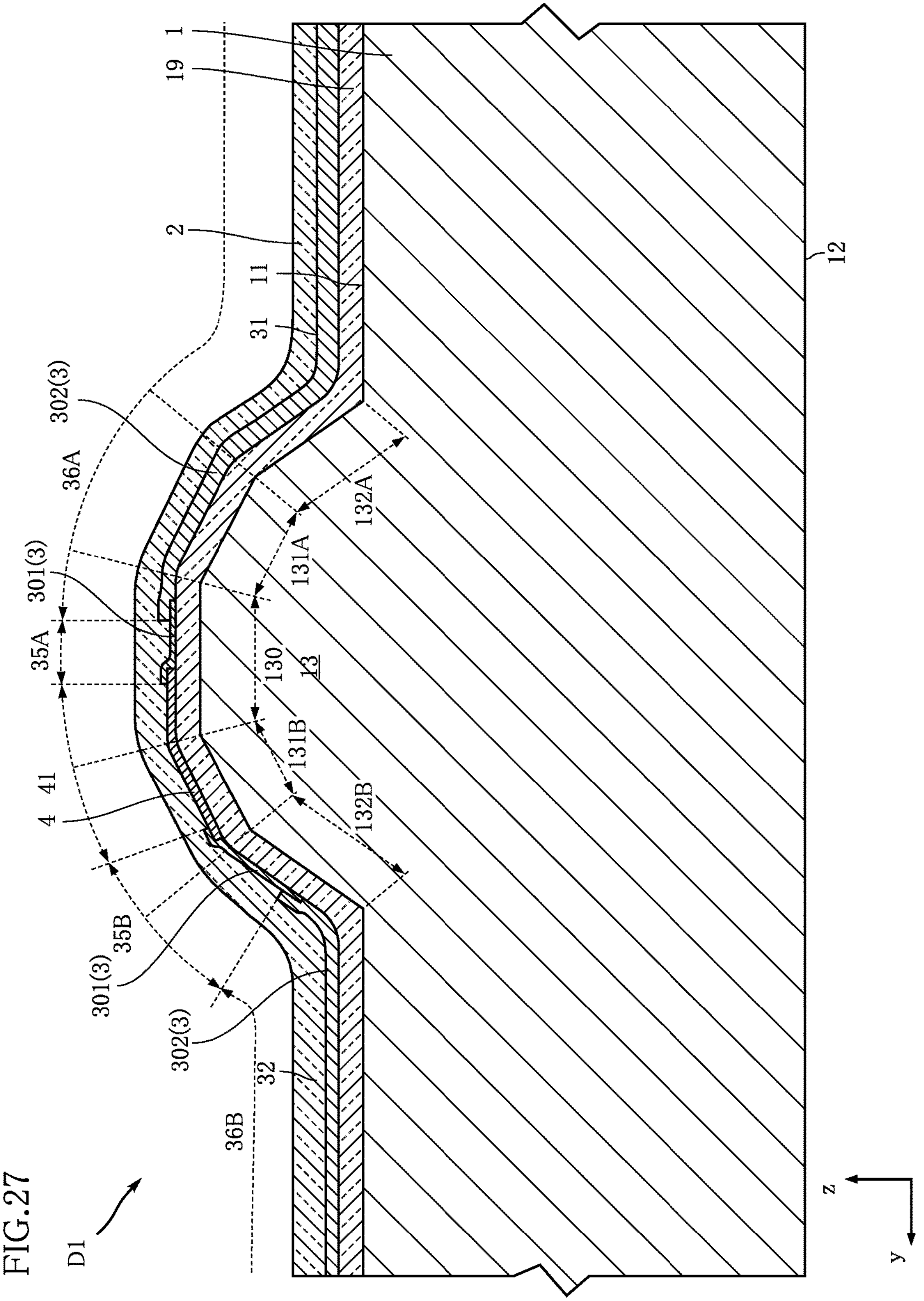
FIG. 27 is an enlarged fragmentary sectional view of the thermal print head according to the fourth embodiment.

FIGS. 26 and 27 show a thermal print head D1 according to a fourth embodiment. FIG. 26 is a fragmentary sectional view showing the thermal print head D1 and corresponds to FIG. 3 of the first embodiment. FIG. 27 is a fragmentary sectional view showing the thermal print head D1 and corresponds to FIG. 6 of the first embodiment.

As shown in FIGS. 26 and 27, the thermal print head D1 has the resistive layer 4 and the first conductive layer 301 covering the regions different from those in the thermal print head A1. Specifically, as shown in FIG. 27, the resistive layer 4 extends from the top part 130 to the first slope 131B. That is, the resistive layer 4 is not disposed on the first slope 131A, the second slopes 132A and 132B and the first obverse surface 11. The first conductive layer 301 is partly disposed on the resistive layer 4, and the other part is disposed directly on the insulating layer 19. The first conductive layer 301 has a plurality of segments, including those disposed on the top part 130 and those extending from the first slope 131B to the second slope 132B. The second conductive layer 302 is partly disposed on the first conductive layer 301, and the other part is disposed directly on the insulating layer 19. The second conductive layer 302 has a plurality of segments, including those extending from the top part 130 along the first slope 131A and the second slope 132A to reach the first obverse surface 11 and those extending from the second slope 132B to the first obverse surface 11. As described above, the wiring layer 3 (the first conductive layer 301 and the second conductive layer 302) and the resistive layer 4 are disposed more locally in the thermal print head D1 than in the thermal print head A1. According to the thermal print head D1, each the heat generating sub-parts 35A and 35B is formed by a part of the first conductive layer 301 exposed from the second conductive layer 302, i.e., a part not overlapping with the second conductive layer 302 as viewed in the z direction. Each of the conductive parts 36A and 36B is formed by a part of the wiring layer 3 where the second conductive layer 302 is present.

A method for manufacturing the thermal print head D1 includes, in sequence, the resistive film deposition step, the resistive film partial removal step, the first deposition step, the first partial removal step, the second deposition step and the second partial removal step. Through these steps, the resistive layer 4 and the wiring layer 3 (the first conductive layer 301 and the second conductive layer 302) are sequentially formed. In other words, the wiring layer forming step is performed after the resistive film deposition step. In this way, as shown in FIGS. 26 and 27, the resistive layer 4 and the first conductive layer 301 are deposited in more limited regions in the thermal print head D1 than in the thermal print head A1.

Similarly to the thermal print head A1, the thermal print head D1 includes the heat generating sub-parts 35A and 35B each of which is located between a heat generating part 41 and a conductive part 36A or 36B. Consequently, the temperature gradient in the sub-scanning direction y is reduced, as compared with the case where the heat generating parts 41 are immediately adjacent to the conductive parts 36A and 36B. Similarly to the first embodiment, the thermal print head D1 can therefore improve durability and reliability.

As shown in FIGS. 26 and 27, the resistive layer 4 and the first conductive layer 301 are disposed more locally in the thermal print head D1 than in the thermal print head A1. The thermal print head D1 therefore allows greater design flexibility as to the sizes and locations of the heat generating parts 41, the heat generating sub-parts 35A and 35B, and the conductive parts 36A and 36B. In addition, the material costs can be reduced as compared to the thermal print head A1.

Figure 28:
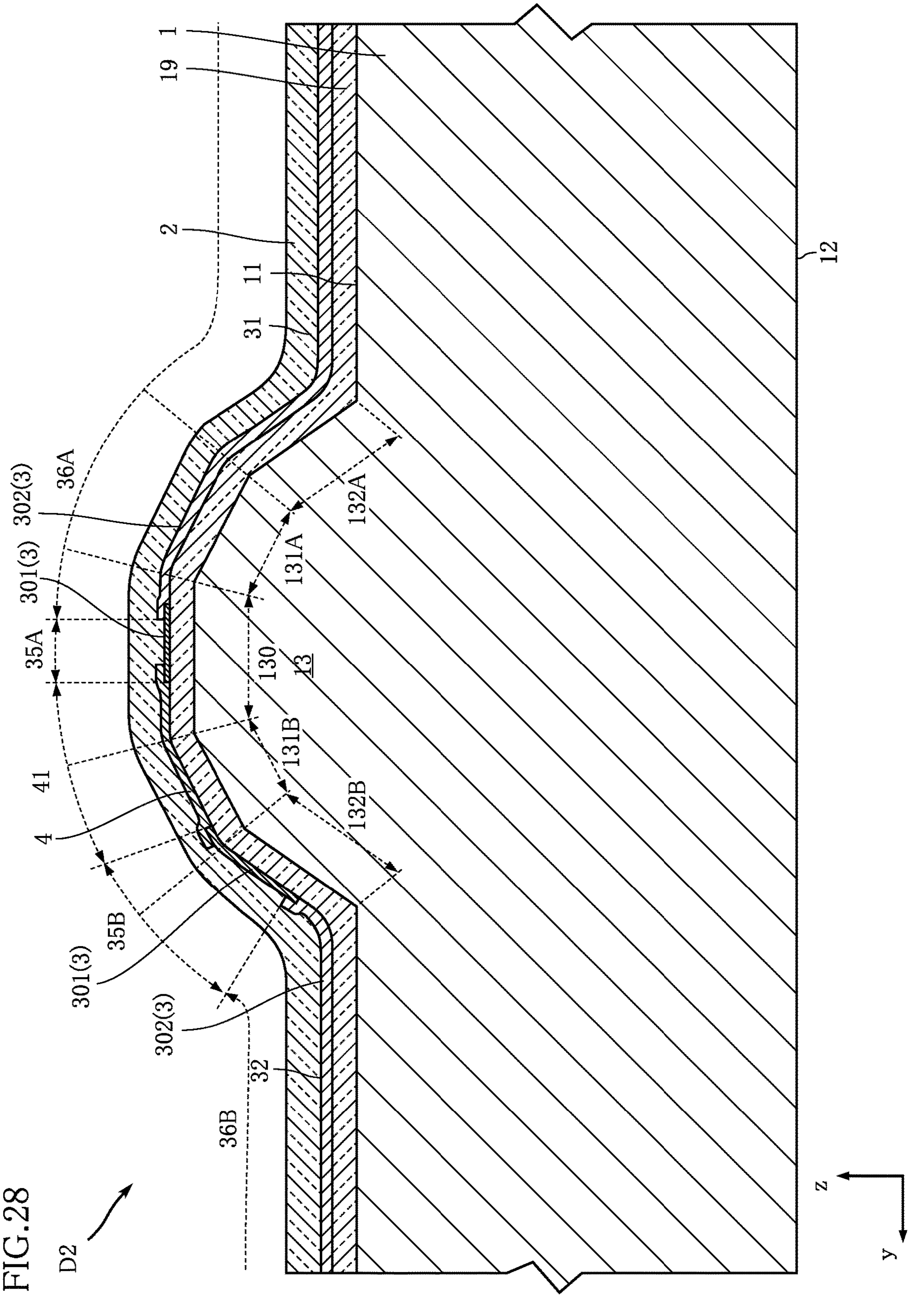
FIG. 28 is an enlarged fragmentary sectional view of a thermal print head according to a variation of the fourth embodiment.
Figure 29:
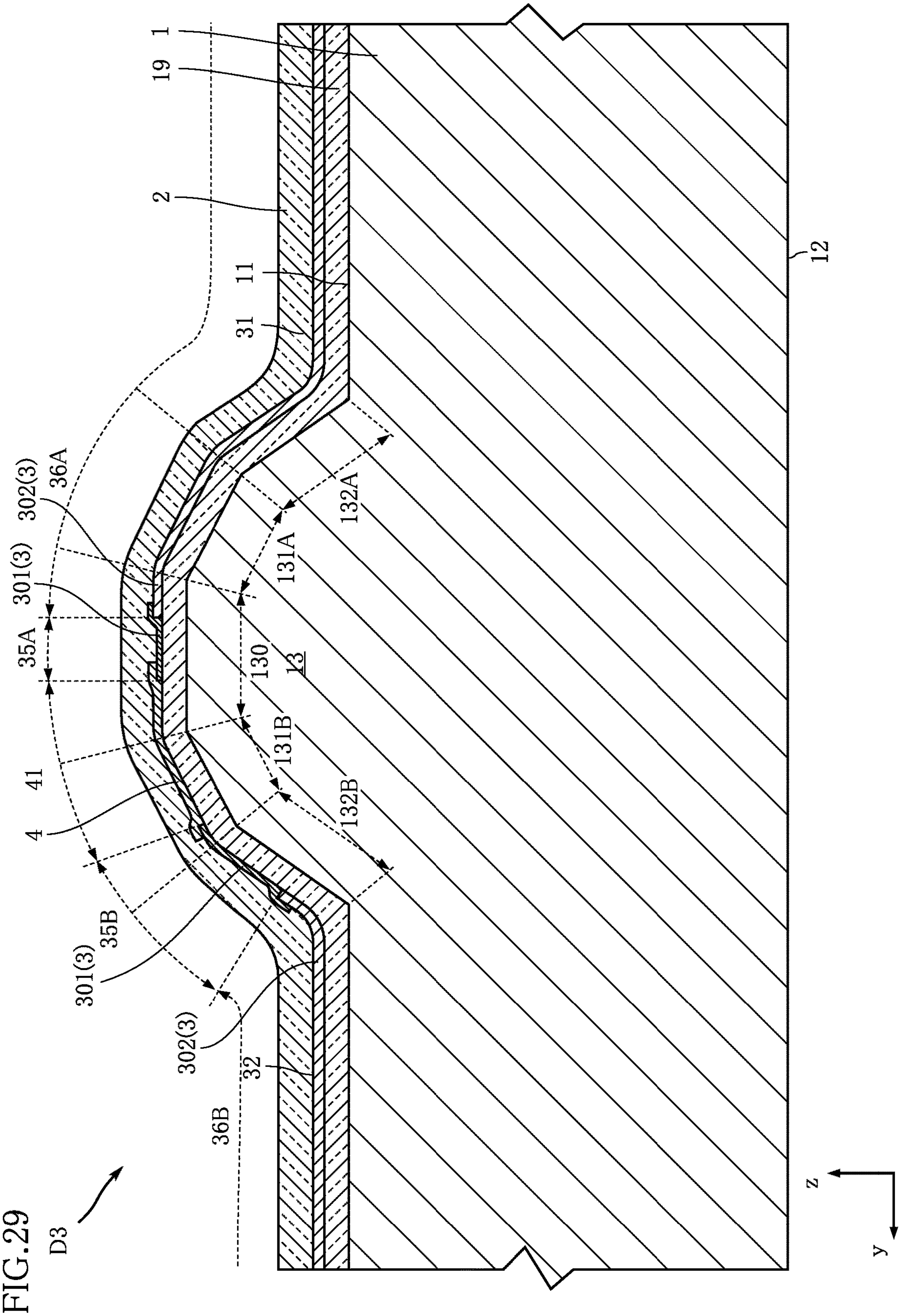
FIG. 29 is an enlarged fragmentary sectional view of a thermal print head according to a variation of the fourth embodiment.

The thermal print head D1 is a variation of the thermal print head A1 having the resistive layer 4 and the first conductive layer 301 disposed more locally. Such a modification may also be made to other configurations. For example, the thermal print heads C1 and C2 may be modified such that the resistive layer 4*a* and the first conductive layer 301 are disposed locally. FIG. 28 is a fragmentary enlarged plan view of a thermal print head D2 that is a variation of the thermal print head C1 modified such that the resistive layer 4*a* and the first conductive layer 301 are disposed locally. FIG. 29 is a fragmentary enlarged plan view of a thermal print head D3 that is a variation of the thermal print head C2 modified such that the resistive layer 4*a* and the first conductive layer 301 are disposed locally.

As shown in FIGS. 28 and 29, the thermal print heads D2 and D3 have the resistive layer 4 and the first conductive layer 301 disposed locally in limited regions. As with the thermal print head D1, this allows greater design flexibility as to the sizes and locations of the heat generating parts 41, the heat generating sub-parts 35A and 35B, and the conductive parts 36A and 36B. In addition, the material costs can be reduced as compared to the thermal print head A1. Notably, in a method for manufacturing of the thermal print heads according to the variations shown in FIGS. 28 and 29, the resistive film deposition step is performed after the wiring layer forming step (that is, the resistive film deposition step is performed after the first partial removal step and the second partial removal step). Consequently, the risk of damaging the resistive layer 4 during processing is reduced, as with the thermal print heads C1 and C2 (see FIGS. 22 to 25) according to the third embodiment and the variation thereof.

Figure 30:
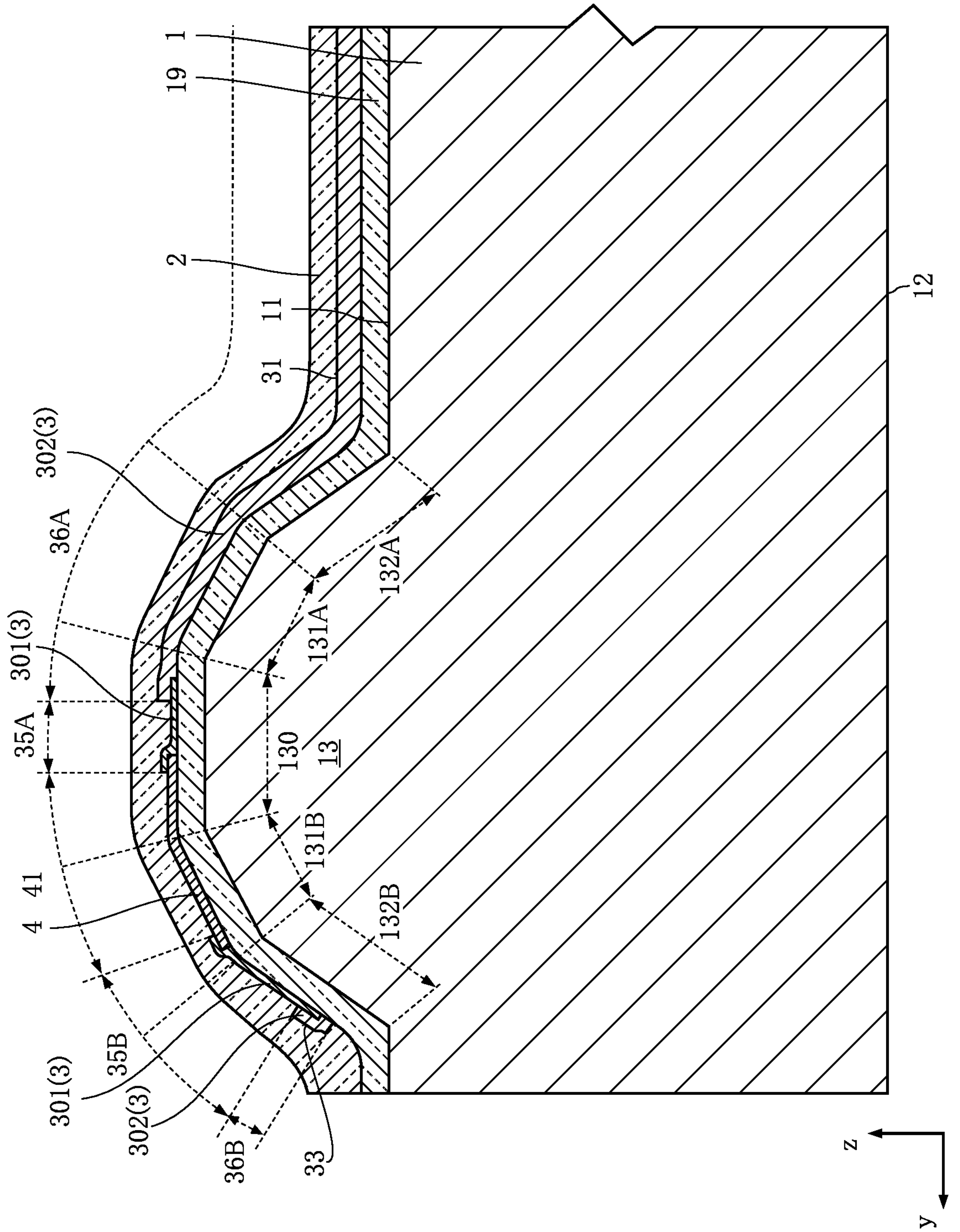
FIG. 30 is an enlarged fragmentary sectional view of the thermal print head according to the variation of the fourth embodiment.

The thermal print heads D1 to D3 may also be modified such that no part of the first obverse surface 11 is located downstream of the ridge 13 in the sub-scanning direction y as in the second embodiment (FIG. 20), or that only a small part of the first obverse surface 11 is located downstream as in the variation of the second embodiment (FIG. 21). FIG. 30 shows a variation of the thermal print head D1 modified such that a small part of the first obverse surface 11 is located downstream as in the variation of the second embodiment. FIG. 30 is a fragmentary enlarged sectional view of the thermal print head according to this variation.

Figure 31:
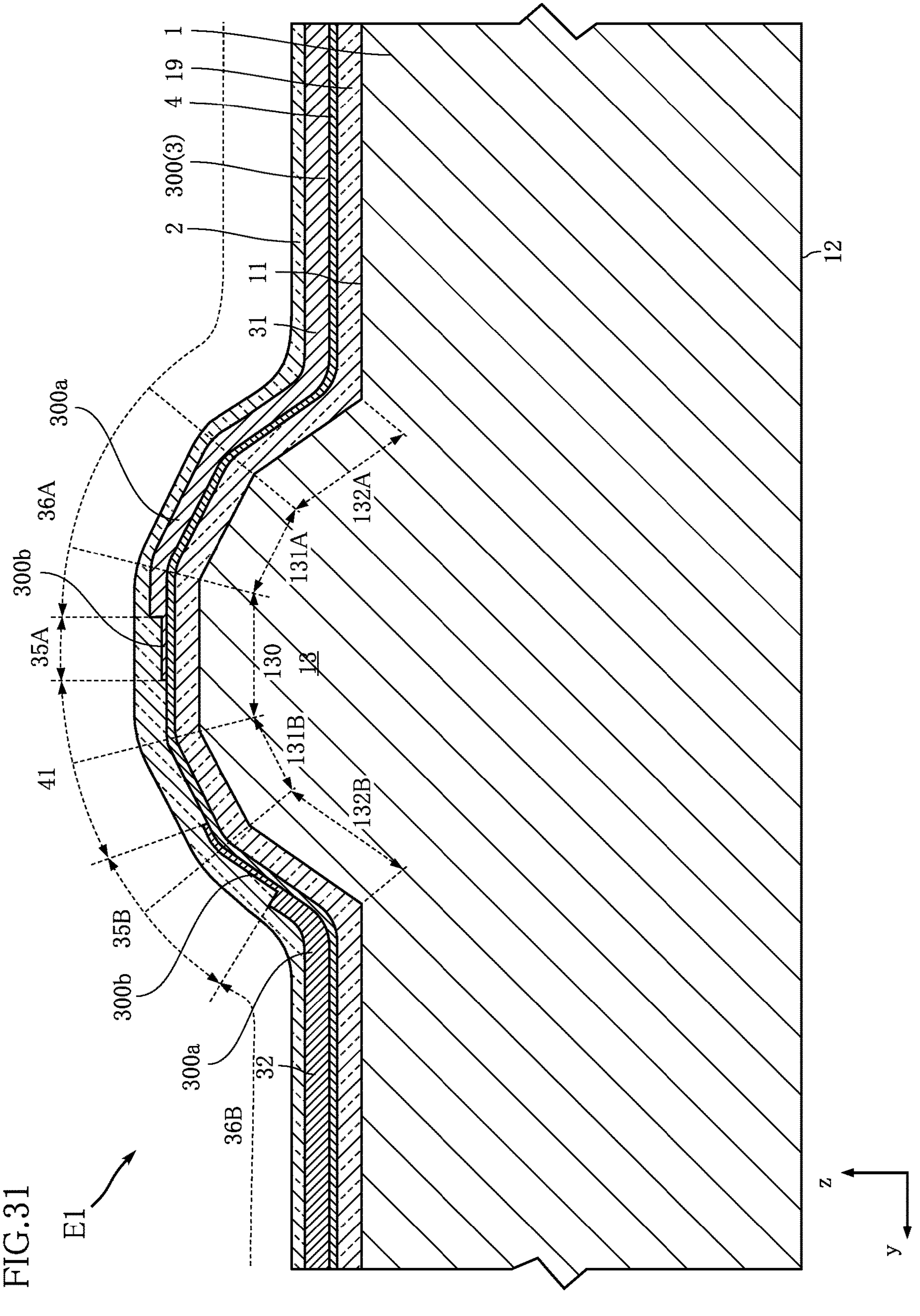
FIG. 31 is an enlarged fragmentary sectional view of a thermal print head according to a fifth embodiment.
Figure 32:
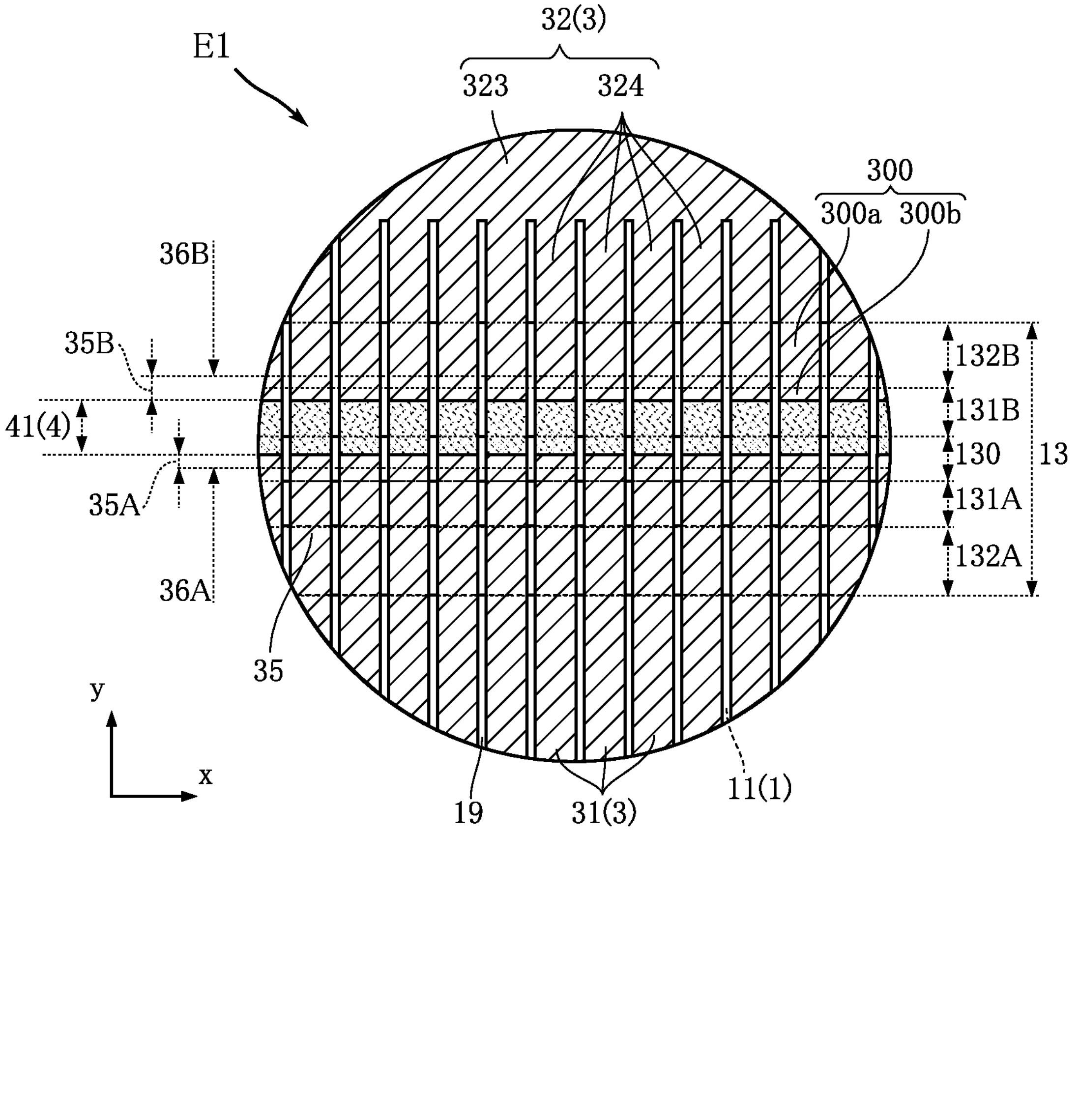
FIG. 32 is an enlarged fragmentary plan view of the thermal print head according to the fifth embodiment.

FIGS. 31 and 32 show a thermal print head E1 according to a fifth embodiment. FIG. 31 is a fragmentary enlarged plan view of the thermal print head E1 and corresponds to FIG. 6 of the first embodiment. FIG. 32 is a fragmentary enlarged plan view of the thermal print head E1 and corresponds to FIG. 3 of the first embodiment.

As shown in FIGS. 31 and 32, the thermal print head E1 differs from the thermal print head A1 in the configuration of the wiring layer 3. The wiring layer 3 of the thermal print head E1 is composed of a single conductive layer 300. This embodiment is a variation of the thermal print head A1 that includes the conductive layer 300 instead of the first conductive layer 301 and the second conductive layer 302. The thermal print heads of other embodiments may also be modified by replacing the first conductive layer 301 and the second conductive layer 302 with the conductive layer 300.

The conductive layer 300 may be made of Cu as with the second conductive layer 302. As shown in FIG. 31, the conductive layer 300 has a thicker part 300*a* and a thinner part 300*b* of different thicknesses. The thicker part 300*a* is thicker than the thinner part 300*b*. Since the thinner part 300*b* is smaller in cross section than the thicker part 300*a*, the resistance value per unit length in the sub-scanning direction y is higher in the thinner part 300*b* than in the thicker part 300*a*. In addition, the resistance value of the thinner part 300*b* per unit length in the sub-scanning direction y is lower than the resistance value of the resistive layer 4 (heat generating parts 41) per unit length in the sub-scanning direction y. The thinner parts 300*b* form the heat generating sub-parts 35A and 35B, and the thicker parts 300*a* form the conductive parts 36A and 36B. The thicknesses of the thicker parts 300*a* and the thinner parts 300*b* are not limited as long as the above-described relation of the resistance values per unit length in the sub-scanning direction y is satisfied.

Similarly to the thermal print head A1, the thermal print head E1 includes the heat generating sub-parts 35A and 35B each of which is located between a heat generating part 41 and a conductive part 36A or 36B. Thus, the temperature gradient in the sub-scanning direction y is reduced, as compared with the case where the heat generating parts 41 are immediately adjacent to the conductive parts 36A and 36B. Similarly to the first embodiment, the thermal print head E1 can therefore improve durability and reliability.

Figure 33:
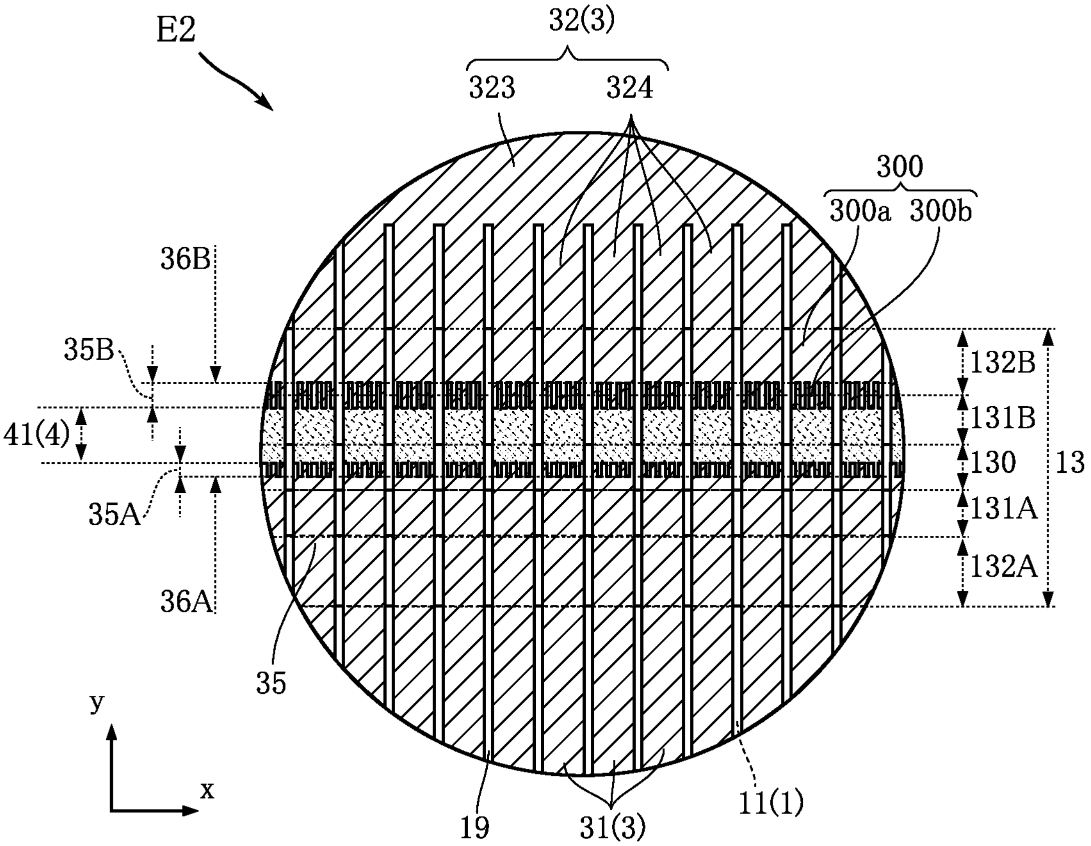
FIG. 33 is an enlarged fragmentary sectional view of a thermal print head according to a variation of the fifth embodiment.

According the fifth embodiment, the heat generating sub-parts 35A and 35B (i.e., the thinner parts 300*b*) are rectangular as viewed in the thickness direction z. However, the shape of the heat generating sub-parts 35A and 35B is not limited to a rectangle. In one variation, patterning may be applied to the thinner parts 300*b*. FIG. 33 is an enlarged fragmentary sectional view of a thermal print head E2 according to this variation and corresponds to FIG. 32. As shown in FIG. 33, each thinner part 300*b* of the thermal print head E2 is patterned into a comb-like shape as viewed in the thickness direction z. The thinner part 300*b* may be patterned into a shape other than the comb-like shape shown in FIG. 33. Patterning the conductive layer 300 in this way can reduce the cross-sectional areas of the heat generating sub-parts 35A and 35B, thereby adjusting the resistance values of the heat generating sub-parts 35A and 35B per unit length in the sub-scanning direction y. According to the thermal print head E2, the heat generating sub-parts 35A and 35B are formed by thinning the conductive layer 300 (by providing the thinner parts 300*b*) and then patterning. However, the present disclosure is not limited to this. For example, patterning may be applied to the conductive layer 300 of a uniform thickness (that is not processed to form the thinner parts 300*b*).

The method for manufacturing a thermal print head, a thermal printer and a thermal print head according to the present disclosure is not limited to the foregoing embodiments. Further, the specific configuration of each part of the thermal print head, the thermal printer and the thermal print head according to the present disclosure may be modified in design in many ways. The present disclosure includes the configurations described in the following clauses.

Clause 1.

A thermal print head comprising:

a substrate made of a single crystal semiconductor and including an obverse surface facing in one sense of a thickness direction;

a resistive layer supported by the substrate and including a plurality of heat generating parts arranged side by side in a main scanning direction; and a wiring layer supported by the substrate and forming a conductive path to the plurality of heat generating parts, wherein the wiring layer includes a conductive part and a heat generating sub-part for each of the plurality of heat generating parts, the conductive part having a lower resistance value per unit length in a sub-scanning direction than the heat generating part, the heat generating sub-part having a resistance value per unit length in the sub-scanning direction that falls between the respective resistance values of the heat generating part and the conductive part, the substrate includes a ridge raised from the obverse surface and extending in the main scanning direction, the heat generating part, the heat generating sub-part and the conductive part are disposed on the ridge, and the heat generating sub-part is located between the heat generating part and the conductive part in the sub-scanning direction.

Clause 2.

The thermal print head according to clause 1, wherein the ridge includes a top part that is most distant from the obverse surface, an upstream-side first slope connected to the top part on an upstream side in the sub-scanning direction, and a downstream-side first slope connected to the top part on a downstream side in the sub-scanning direction, the upstream-side first slope and the downstream-side first slope are inclined to the obverse surface at a first inclination angle, and the heat generating part extends from the downstream-side first slope to the top part.

Clause 3.

The thermal print head according to clause 2, wherein the ridge includes an upstream-side second slope connected to the upstream-side first slope on an opposite side from the top part in the sub-scanning direction, and a downstream-side second slope connected to the downstream-side first slope on an opposite side from the top part in the sub-scanning direction, the upstream-side second slope and the downstream-side second slope are inclined to the obverse surface at a second inclination angle, and the second inclination angle is greater than the first inclination angle.

Clause 4.

The thermal print head according to clause 3, wherein the heat generating sub-part includes an upstream-side heat generating sub-part located upstream from the heat generating part in the sub-scanning direction, and a downstream-side heat generating sub-part located downstream from the heat generating part in the sub-scanning direction.

Clause 5.

The thermal print head according to clause 4, wherein the conductive part includes an upstream-side conductive part adjacent to the upstream-side heat generating sub-part on an opposite side from the heat generating part in the sub-scanning direction, and a downstream-side conductive part adjacent to the downstream-side heat generating sub-part on an opposite side from the heat generating part in the sub-scanning direction.

Clause 6.

The thermal print head according to clause 5, wherein the upstream-side heat generating sub-part is disposed on the top part.

Clause 7.

The thermal print head according to clause 6, wherein the upstream-side conductive part extends from the top part along the upstream-side first slope and the upstream-side second slope to reach the obverse surface.

Clause 8.

The thermal print head according to any one of clauses 5 to 7, wherein the downstream-side heat generating sub-part extends from the downstream-side second slope to the downstream-side first slope.

Clause 9.

The thermal print head according to clause 8, wherein the downstream-side conductive part is disposed on the downstream-side second slope.

Clause 10.

The thermal print head according to any one of clauses 1 to 9, wherein the wiring layer and the resistive layer overlap with each other at least in part as viewed in the thickness direction, and each of the plurality of heat generating parts is formed by a part of the resistive layer not overlapping with the wiring layer as viewed in the thickness direction.

Clause 11.

The thermal print head according to clause 10, wherein the wiring layer includes a first conductive layer and a second conductive layer stacked in the thickness direction, the conductive part is formed by a part where the second conductive layer is present, and the heat generating sub-part is formed by a part of the first conductive layer not overlapping with the second conductive layer as viewed in the thickness direction.

Clause 12.

The thermal print head according to clause 11, wherein the resistive layer is disposed on the substrate, the first conductive layer is disposed on the resistive layer such that a part of the resistive layer remains exposed, and the second conductive layer is disposed on the first conductive layer such that a part of the first conductive layer remains exposed.

Clause 13.

The thermal print head according to clause 11, wherein the first conductive layer is disposed on the substrate, the second conductive layer is disposed on the first conductive layer such that a part of the first conductive layer remains exposed, and the resistive layer is disposed on the substrate and at least overlaps with the part of the first conductive layer exposed from the second conductive layer as viewed in the thickness direction.

Clause 14.

The thermal print head according to any one of clauses 11 to 13, wherein the first conductive layer is thinner than the second conductive layer.

Clause 15.

The thermal print head according to any one of clauses 11 to 14, wherein the first conductive layer is made of a material having a lower heat conductivity than that of the second conductive layer.

Clause 16.

The thermal print head according to clause 10, wherein the wiring layer includes a thicker part and a thinner part having mutually different dimensions in the thickness direction, the heat generating sub-part is formed by the thinner part, and the conductive part is formed by the thicker part.

Clause 17.

The thermal print head according to clause 16, wherein the thinner part is patterned as viewed in the thickness direction.

Clause 18.

The thermal print head according to any one of clauses 1 to 17, wherein the single crystal semiconductor is Si.

Clause 19.

A thermal printer comprising:

the thermal print head according to any one of clauses 1 to 18; and a platen directly opposite the thermal print head.

Clause 20.

A method for manufacturing a thermal print head, comprising:

a substrate preparing step of preparing a substrate made of a single crystal semiconductor;

a substrate processing step of processing the substrate to form an obverse surface facing in one sense of a thickness direction and a ridge that is raised from the obverse surface and extends in a main scanning direction;

a resistive layer forming step of forming a resistive layer that is supported by the substrate and includes a plurality of heat generating parts arranged side by side in the main scanning direction; and a wiring layer forming step of forming a wiring layer that is supported by the substrate and forms a conductive path to the plurality of heat generating parts, wherein the wiring layer includes a conductive part and a heat generating sub-part for each of the plurality of heat generating parts, the conductive part having a lower resistance value per unit length in a sub-scanning direction than the heat generating part, the heat generating sub-part having a resistance value per unit length in the sub-scanning direction that falls between the respective resistance values of the heat generating part and the conductive part, the heat generating part, the heat generating sub-part and the conductive part are formed on the ridge, and the heat generating sub-part is located between the heat generating part and the conductive part in the sub-scanning direction.

Clause 21.

The method according to clause 20, wherein the resistive layer forming step includes a resistive film deposition step of depositing a resistive film, the wiring layer forming step includes a first deposition step of depositing a first conductive film, a first partial removal step of removing a part of the first conductive film to form a first conductive layer, and a second deposition step of depositing a second conductive film, and a second partial removal step of removing a part of the second conductive film to form a second conductive layer, the first conductive layer and the second conductive layer are stacked in the thickness direction, the conductive part is formed by a part where the second conductive layer is present, and the heat generating sub-part is formed by a part of the first conductive layer not overlapping with the second conductive layer as viewed in the thickness direction.

Clause 22.

The method according to clause 21, wherein the resistive film deposition step is performed before the wiring layer forming step.

Clause 23.

The method according to clause 21, wherein the resistive film deposition step is performed after the wiring layer forming step.

REFERENCE NUMERALS

A1, B1, B2, C1, C2, D1 to D3, E1, E2: thermal print head
1: head substrate 1K: material substrate
11, 11K: first obverse surface 12, 12K: first reverse surface
13, 13K: ridge 130, 130K: top part
131A, 131B: first slope 132A, 132B: second slope
132K: slope 19: insulating layer 2: protective layer
21: pad opening 3: wiring layer 300: conductive layer
300*a*: thicker part 300*b*: thinner part 301: first conductive layer
302: second conductive layer 3K: wiring film 301K: first conductive film
302K: second conductive film 31: individual electrode 311: individual-electrode pad
32: common electrode 323: connecting part 324: strip part
325: branching part 33: relay electrode 35A, 35B: heat generating sub-part
36A, 36B: conductive part 4: resistive layer
4K: resistive film 41: heat generating part 5: connecting substrate
51: second obverse surface 52: second reverse surface 59: connector
61: wire 62: wire 7: driver IC
78: protective resin 8: heat dissipating member 81: first supporting surface
82: second supporting surface Pr: thermal printer
91: platen roller 910: center of contact
x: main scanning direction y: sub-scanning direction z: thickness direction

The invention claimed is:

1. A thermal print head comprising:

a substrate made of a single crystal semiconductor and including an obverse surface facing in one sense of a thickness direction;

a resistive layer supported by the substrate and including a plurality of heat generating parts arranged side by side in a main scanning direction;

a wiring layer supported by the substrate and forming a conductive path to the plurality of heat generating parts;

an insulating layer supported by the substrate; and a protective layer covering the resistive layer and the wiring layer, wherein the wiring layer includes a conductive part and a heat generating sub-part for each of the plurality of heat generating parts, the conductive part having a lower resistance value per unit length in a sub-scanning direction than the heat generating part, the heat generating sub-part having a resistance value per unit length in the sub-scanning direction that falls between the respective resistance values of the heat generating part and the conductive part, the substrate includes a ridge raised from the obverse surface and extending in the main scanning direction, the heat generating part, the heat generating sub-part and the conductive part are disposed on the ridge, the heat generating sub-part is located between the heat generating part and the conductive part in the sub-scanning direction, the ridge includes a top part that is most distant from the obverse surface, an upstream-side first slope connected to the top part on an upstream side in the sub-scanning direction, a downstream-side first slope connected to the top part on a downstream side in the sub-scanning direction, and a downstream-side second slope connected to the downstream-side first slope on an opposite side from the top part in the sub-scanning direction, the upstream-side first slope and the downstream-side first slope are inclined to the obverse surface at a first inclination angle, the heat generating part extends from the downstream-side first slope to the top part, and the insulating layer is in contact with the protective layer above the downstream-side second slope.

2. The thermal print head according to claim 1, wherein the ridge includes an upstream-side second slope connected to the upstream-side first slope on an opposite side from the top part in the sub-scanning direction, the upstream-side second slope and the downstream-side second slope are inclined to the obverse surface at a second inclination angle, and the second inclination angle is greater than the first inclination angle.

3. The thermal print head according to claim 2, wherein the heat generating sub-part includes an upstream-side heat generating sub-part located upstream from the heat generating part in the sub-scanning direction, and a downstream-side heat generating sub-part located downstream from the heat generating part in the sub-scanning direction.

4. The thermal print head according to claim 3, wherein the conductive part includes an upstream-side conductive part adjacent to the upstream-side heat generating sub-part on an opposite side from the heat generating part in the sub-scanning direction, and a downstream-side conductive part adjacent to the downstream-side heat generating sub-part on an opposite side from the heat generating part in the sub-scanning direction.

5. The thermal print head according to claim 4, wherein the upstream-side heat generating sub-part is disposed on the top part.

6. The thermal print head according to claim 5, wherein the upstream-side conductive part extends from the top part along the upstream-side first slope and the upstream-side second slope to reach the obverse surface.

7. The thermal print head according to claim 4, wherein the downstream-side heat generating sub-part extends from the downstream-side second slope to the downstream-side first slope.

8. The thermal print head according to claim 7, wherein the downstream-side conductive part is disposed on the downstream-side second slope.

9. The thermal print head according to claim 1, wherein the wiring layer and the resistive layer overlap with each other at least in part as viewed in the thickness direction, and each of the plurality of heat generating parts is formed by a part of the resistive layer not overlapping with the wiring layer as viewed in the thickness direction.

10. The thermal print head according to claim 9, wherein the wiring layer includes a first conductive layer and a second conductive layer stacked in the thickness direction, the conductive part is formed by a part where the second conductive layer is present, and the heat generating sub-part is formed by a part of the first conductive layer not overlapping with the second conductive layer as viewed in the thickness direction.

11. The thermal print head according to claim 10, wherein the resistive layer is disposed on the substrate, the first conductive layer is disposed on the resistive layer such that a part of the resistive layer remains exposed, and the second conductive layer is disposed on the first conductive layer such that a part of the first conductive layer remains exposed.

12. The thermal print head according to claim 10, wherein the first conductive layer is disposed on the substrate, the second conductive layer is disposed on the first conductive layer such that a part of the first conductive layer remains exposed, and the resistive layer is disposed on the substrate and at least overlaps with the part of the first conductive layer exposed from the second conductive layer as viewed in the thickness direction.

13. The thermal print head according to claim 10, wherein the first conductive layer is thinner than the second conductive layer.

14. The thermal print head according to claim 10, wherein the first conductive layer is made of a material having a lower heat conductivity than that of the second conductive layer.

15. The thermal print head according to claim 9, wherein the wiring layer includes a thicker part and a thinner part having mutually different dimensions in the thickness direction, the heat generating sub-part is formed by the thinner part, and the conductive part is formed by the thicker part.

16. The thermal print head according to claim 15, wherein the thinner part is patterned as viewed in the thickness direction.

17. The thermal print head according to claim 1, wherein the single crystal semiconductor is Si.

18. A thermal printer comprising:

the thermal print head according to claim 1; and a platen directly opposite the thermal print head.

19. A method for manufacturing a thermal print head, comprising:

a substrate preparing step of preparing a substrate made of a single crystal semiconductor;

a substrate processing step of processing the substrate to form an obverse surface facing in one sense of a thickness direction and a ridge that is raised from the obverse surface and extends in a main scanning direction;

a resistive layer forming step of forming a resistive layer that is supported by the substrate and includes a plurality of heat generating parts arranged side by side in the main scanning direction;

an insulating layer preparing step of preparing an insulating layer supported by the substrate;

a wiring layer forming step of forming a wiring layer that is supported by the substrate and forms a conductive path to the plurality of heat generating parts; and a protective layer preparing step of preparing a protective layer covering the resistive layer and the wiring layer, wherein the wiring layer includes a conductive part and a heat generating sub-part for each of the plurality of heat generating parts, the conductive part having a lower resistance value per unit length in a sub-scanning direction than the heat generating part, the heat generating sub-part having a resistance value per unit length in the sub-scanning direction that falls between the respective resistance values of the heat generating part and the conductive part, the heat generating part, the heat generating sub-part and the conductive part are formed on the ridge, the heat generating sub-part is located between the heat generating part and the conductive part in the sub-scanning direction, the ridge includes a top part that is most distant from the obverse surface, an upstream-side first slope connected to the top part on an upstream side in the sub-scanning direction, a downstream-side first slope connected to the top part on a downstream side in the sub-scanning direction, and a downstream-side second slope connected to the a downstream-side first slope on an opposite side from the top part in the sub-scanning direction, the upstream-side first slope and the downstream-side first slope are inclined to the obverse surface at a first inclination angle, the heat generating part extends from the downstream-side first slope to the top part, and the insulating layer is in contact with the protective layer on the downstream-side second slope.

20. The method according to claim 19, wherein the resistive layer forming step includes a resistive film deposition step of depositing a resistive film, the wiring layer forming step includes a first deposition step of depositing a first conductive film, a first partial removal step of removing a part of the first conductive film to form a first conductive layer, and a second deposition step of depositing a second conductive film, and a second partial removal step of removing a part of the second conductive film to form a second conductive layer, the first conductive layer and the second conductive layer are stacked in the thickness direction, the conductive part is formed by a part where the second conductive layer is present, and the heat generating sub-part is formed by a part of the first conductive layer not overlapping with the second conductive layer as viewed in the thickness direction.

21. The method according to claim 20, wherein the resistive film deposition step is performed before the wiring layer forming step.

22. The method according to claim 20, wherein the resistive film deposition step is performed after the wiring layer forming step.

23. A thermal print head comprising:

a substrate made of a single crystal semiconductor and including an obverse surface facing in one sense of a thickness direction;

an insulating layer supported by the substrate;

a resistive layer supported by the substrate and including a plurality of heat generating parts arranged side by side in a main scanning direction; and a wiring layer supported by the substrate and forming a conductive path to the plurality of heat generating parts, wherein the substrate includes a ridge raised from the obverse surface and extending in the main scanning direction, the wiring layer includes a conductive part and a heat generating sub-part for each of the plurality of heat generating parts, the conductive part having a lower resistance value per unit length in a sub-scanning direction than the heat generating part, the heat generating sub-part having a resistance value per unit length in the sub-scanning direction that falls between the respective resistance values of the heat generating part and the conductive part, the wiring part includes a first conductive layer and a second conductive layer, the conductive part is formed by a part where the first conductive layer is in contact with the insulating layer, the heat generating sub-part is formed by a part where the second conductive layer is in contact with the insulating layer, the first conductive layer and the second conductive layer partially overlap with each other as viewed in the thickness direction, the entire first conductive layer overlaps with the ridge as viewed in the thickness direction, the heat generating part, the heat generating sub-part and the conductive part are disposed on the ridge, and the heat generating sub-part is located between the heat generating part and the conductive part in the sub-scanning direction.

24. A thermal print head according to claim 23, wherein the resistive layer and the first conductive layer overlap with each other at least in part as viewed in the thickness direction, and the entire resistive layer overlaps with the ridge as viewed in the thickness direction.

* * * * *